(12) United States Patent
Schmidt et al.

(10) Patent No.: US 10,741,855 B2
(45) Date of Patent: Aug. 11, 2020

(54) SWIRL BURNER WITH FUEL INJECTION UPSTREAM AND DOWNSTREAM OF THE SWIRLER

(71) Applicant: Ceres Intellectual Property Company Limited, Sussex (GB)

(72) Inventors: Martin Schmidt, Sussex (GB); Paul Barnard, Sussex (GB); Tony Toher, Sussex (GB)

(73) Assignee: Ceres Intellectual Property Company Limited, Sussex (GB)

(*) Notice: Subject to any disclaimer, the term of this patent is extended or adjusted under 35 U.S.C. 154(b) by 517 days.

(21) Appl. No.: 15/537,351

(22) PCT Filed: Dec. 2, 2015

(86) PCT No.: PCT/GB2015/053683
§ 371 (c)(1),
(2) Date: Jun. 16, 2017

(87) PCT Pub. No.: WO2016/097687
PCT Pub. Date: Jun. 23, 2016

(65) Prior Publication Data
US 2017/0346107 A1  Nov. 30, 2017

(30) Foreign Application Priority Data

Dec. 19, 2014 (GB) .................. 1422845.6

(51) Int. Cl.
*F23C 7/00* (2006.01)
*F23D 14/02* (2006.01)
(Continued)

(52) U.S. Cl.
CPC ......... *H01M 8/04022* (2013.01); *F23C 7/004* (2013.01); *F23D 14/02* (2013.01);
(Continued)

(58) Field of Classification Search
CPC ........... F23C 7/004; F23D 2900/14021; F23D 2900/14701; F23D 17/007; F23D 17/002; F23D 17/005; F23D 2204/00
(Continued)

(56) References Cited

U.S. PATENT DOCUMENTS 4,431,403 A * 2/1984 Nowak .................. F23C 7/004
239/400
4,595,355 A 6/1986 Garrelfs et al.
(Continued)

FOREIGN PATENT DOCUMENTS

JP   2011169528 A   9/2011
RU       9934 U1    5/1999
(Continued)

OTHER PUBLICATIONS

International Search Report and Written Opinion of the International Searching Authority (9 pages) dated Feb. 19, 2016.
(Continued)

*Primary Examiner* — Avinash A Savani
*Assistant Examiner* — Deepak A Deean
(74) *Attorney, Agent, or Firm* — Timothy W. Menasco, Esq.; Harter Secrest & Emery LLP

(57) ABSTRACT

The present invention is concerned with improved swirl burners, particularly, but not limited to, swirl burners used in fuel cell systems.

20 Claims, 9 Drawing Sheets

(51) Int. Cl.
*F23G 7/06* (2006.01)
*H01M 8/04014* (2016.01)
*H01M 8/124* (2016.01)

(52) U.S. Cl.
CPC .......... *F23G 7/065* (2013.01); *F23D 2204/00* (2013.01); *F23D 2900/14021* (2013.01); *F23D 2900/14701* (2013.01); *H01M 2008/1293* (2013.01)

(58) Field of Classification Search
USPC ........................................................ 431/187
See application file for complete search history.

(56) References Cited

U.S. PATENT DOCUMENTS

| | | | | |
|---|---|---|---|---|
| 5,451,160 | A * | 9/1995 | Becker | F23D 17/002 431/183 |
| 7,402,038 | B2 * | 7/2008 | Neville | F23C 6/047 431/12 |
| 2004/0234912 | A1 * | 11/2004 | Sarv | F23D 1/00 431/183 |
| 2007/0028617 | A1 | 2/2007 | Hsieh et al. | |
| 2013/0344409 | A1 * | 12/2013 | Fischer | F23M 9/00 429/425 |
| 2016/0076763 | A1 * | 3/2016 | Batz | F23C 6/047 431/187 |
| 2018/0156451 | A1 * | 6/2018 | Hirata | F23C 6/045 |

FOREIGN PATENT DOCUMENTS

| | | |
|---|---|---|
| SU | 1333963 A1 | 8/1987 |
| WO | 02/035628 A1 | 5/2002 |
| WO | 03/007582 A1 | 1/2003 |
| WO | 2004089848 A1 | 10/2004 |
| WO | 2005078843 A1 | 8/2005 |
| WO | 2006079800 A1 | 8/2006 |
| WO | 2006106334 A1 | 10/2006 |
| WO | 2007085863 A1 | 8/2007 |
| WO | 2007110587 A2 | 10/2007 |
| WO | 2008001119 A2 | 1/2008 |
| WO | 2008003976 A1 | 1/2008 |
| WO | 2008015461 A1 | 2/2008 |
| WO | 2008053213 A1 | 5/2008 |
| WO | 2008104760 A1 | 9/2008 |
| WO | 2008132493 A2 | 11/2008 |
| WO | 2009090419 A2 | 7/2009 |
| WO | 2010020797 A1 | 2/2010 |
| WO | 2010061190 A2 | 6/2010 |

OTHER PUBLICATIONS

UKIPO Search Report (1 page) dated Jul. 1, 2015.
UKIPO Search Report (2 pages) dated Apr. 22, 2020.

* cited by examiner

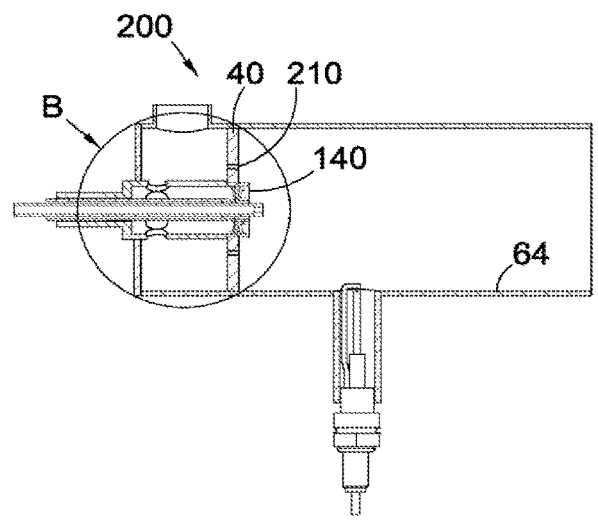
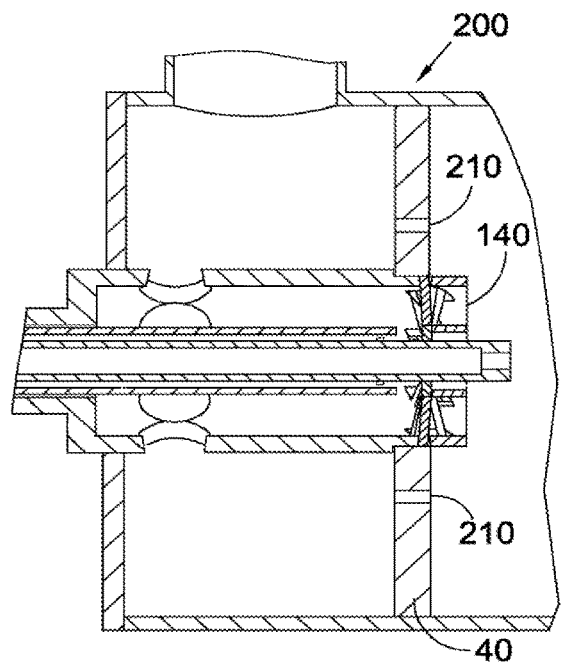
Figure 3
Figure 4
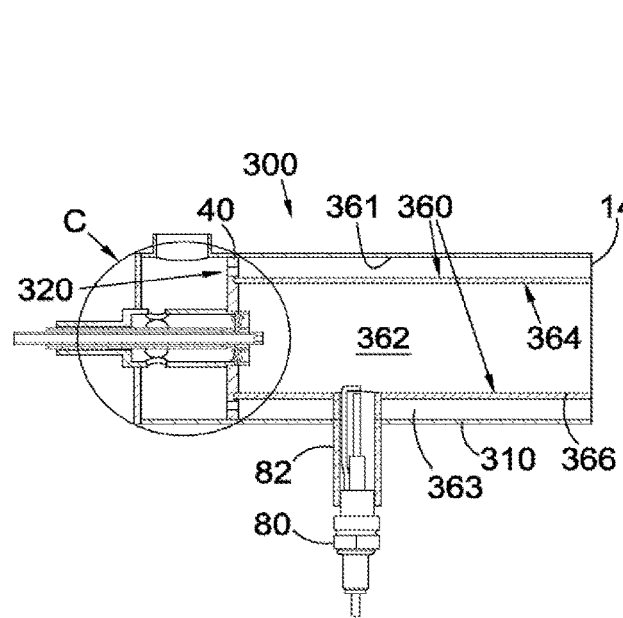
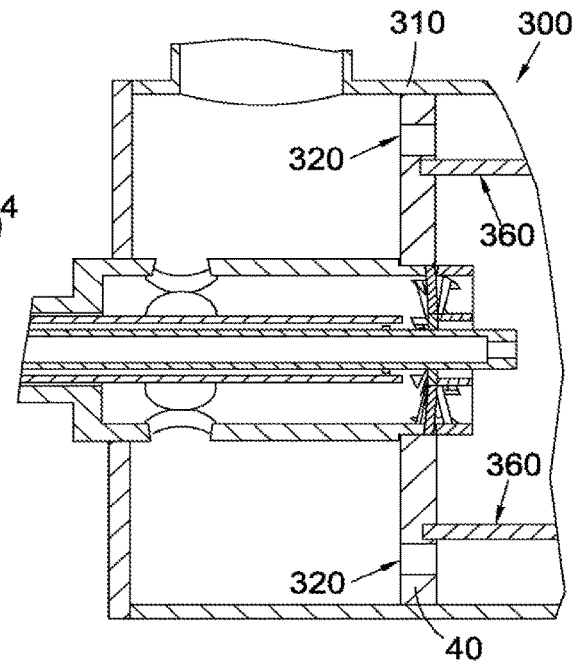
Figure 5
Figure 6

SWIRL BURNER WITH FUEL INJECTION UPSTREAM AND DOWNSTREAM OF THE SWIRLER

FIELD OF THE INVENTION

The present invention is concerned with improved swirl burners, particularly, but not limited to, swirl burners used in fuel cell systems.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO02/35628, WO03/07582, WO2004/089848, WO2005/078843, WO2006/079800, WO2006/106334, WO2007/085863, WO2007/110587, WO2008/001119, WO2008/003976, WO2008/015461, WO2008/053213, WO2008/104760, WO2008/132493, WO2009/090419, WO2010/020797, and WO2010/061190, which are incorporated herein by reference in their entirety.

Unless the context dictates otherwise, the term "fluid" incorporates both liquids and gases.

Legislation and the general trend of improved environmental responsibility encourages an interest in reducing the emissions produced by the burning or combustion of fuel in all operations. In fuel cell operation in particular, there is legislation which sets maximum limits for emission levels, such as European standard EN 50465:2008 which applies to a fuel cell gas heating appliance when in domestic use. Of particular importance in controlling emissions is the reduction of carbon monoxide (CO) and nitrous oxides ($NO_x$) emissions.

Burner design is of great importance when it comes to controlling combustion emissions. Factors such as the air flow, the mixing of reactants and the position of the flame must all be considered along with the chemical composition of the fuel to be burned. A change in the composition of a fuel combusted in the same burner can result in very different emissions. Therefore, it is often necessary to design a burner for a specific fuel in order to adhere to the required emission limits. Despite this, there are situations where a burner must be fuelled by various fuels, and where combustion stability and emission control is important in each of these modes.

Burners are often used in fuel cell systems to provide thermal energy to raise the temperature of the fuel cell system and its related system parts to operating temperature. A fuel cell system typically includes at least one fuel cell stack.

Where reference is made herein to a fuel cell or fuel cell system then more preferably, the reference is to a solid oxide fuel cell (SOFC) or SOFC system, more preferably to an intermediate temperature solid oxide fuel cell (IT-SOFC) or IT-SOFC system. A fuel cell system will comprise an at least one fuel cell stack, each fuel cell stack comprising at least one fuel cell. More preferably, the fuel cell has, or fuel cells of the fuel cell stack have, an operational temperature range of 450-650 deg C., more preferably 500-610, or 500-615 or 500-620 deg C., and possibly 615 to 620 deg C.

When utilizing solid oxide fuel cells, it is preferable that the burner is fuelled by both a low calorific value (LCV) fuel and a high calorific value (HCV) fuel. It should be noted that these terms are distinct from e.g. "lower calorific value" (also referred to as "LCV") and "higher calorific value" (also referred to as "HCV")—all fuels have both a lower calorific value and a higher calorific value. Examples of low calorific value (LCV) fuels are those with a high fraction of $H_2$, CO, and optionally with a low fraction of $CH_4$. The Wobbe index for a LCV fuel is typically between 18 and 35 $MJ/m^3$. Examples of high calorific value (HCV) fuels are those comprising of methane, ethane or propane or any combination therein, the Wobbe index for a HCV fuel is typically between 36 and 85 $MJ/m^3$.

The fuel cell stack uses a hydrogen-rich HCV fuel for the electrochemical reaction. As a result of the electrochemical reaction, the fuel gas changes composition with some of the reactive elements being oxidised, such as hydrogen becoming water vapour and carbon monoxide becoming carbon dioxide. As a result, the off-gases from this process are an LCV fuel. It is therefore clear that a HCV fuel is distinct from an LCV fuel.

The LCV fuel formed from the electrochemical reaction can then be combusted in a burner. However, the combustion of a HCV fuel is typically required to initially heat the fuel cell system (e.g. at start-up) until the fuel cell reaches operating temperature. Thus, at start-up it is necessary to combust an HCV fuel. During steady-state operation of the fuel cell it is necessary to combust a predominantly LCV fuel. During the transition between fuel cell operating point states (i.e. when the electrical power output of the fuel cell is changed), the composition of the fuel to be combusted changes accordingly, and similarly changes during the transition from steady-state to shut-down. To maintain low emissions with the combustion of each of these fuels, different configurations of burner are required: an HCV fuel burner favours a great degree of mixing with an oxidant prior to combustion; whereas an LCV fuel burner favours a low amount of mixing with an oxidant prior to combustion. Furthermore, a greater airflow is preferred for an HCV fuel compared to an LCV fuel. However, due to requirements elsewhere in the system, such as the oxidant flow being used to control the temperature of the fuel cell stack, it is rarely possible to control airflow to the burner solely for combustion control purposes. It is therefore clear that in the situation described, utilizing a burner designed for one of the fuels or for a specific airflow would result in unfavourable combustion for the other fuel.

It is therefore desirable to produce a burner which is able to combust both LCV and HCV fuels either at the same time, or individually, without separating the combustion or utilizing complex systems, whilst maintaining low emissions and coping with the varying airflows and, in particular, a wide ranging air to fuel ratio, lambda.

Prior art devices can also suffer from a lack of flame stability over a wide range of operating conditions, including different lambdas. In addition, it is also desirable to achieve a compact flame in order to reduce product size.

The present invention seeks to improve upon prior art burners. In particular, it seeks to address, overcome or mitigate at least one of the prior art issues.

SUMMARY OF THE INVENTION

According to the present invention there is provided a swirl burner assembly comprising:
(i) a hollow longitudinally elongate body extending along a central axis and having a first end and a second end,
(ii) an end wall at said first end,
(iii) a burner wall located between said first end and said second end, and defining a first volume from said first end to said burner wall, and a second volume from said burner wall to said second end, (iv) an oxidant inlet into said first volume, (v) at least one hollow longitudinally elongate burner unit having a burner unit first end extending outwardly of an opening in said body from said first volume, the burner unit extending through an opening in said burner wall from said first volume to said second volume to a burner unit second end, and defining a burner unit inner volume, and comprising:

(a) an axial-swirl swirl mixer positioned inward of the burner unit and located between said burner unit first end and said burner unit second end, said swirl mixer comprising a plurality of vanes having an inner diameter and an outer diameter, a first side which is positioned towards and opening into said first volume, and a second side positioned towards and opening into said second volume, (b) a first fuel inlet into said first volume, said first fuel inlet positioned between said oxidant inlet and said swirl mixer and radially inward of said outer diameter of said plurality of vanes, and (c) a second fuel inlet into said second volume proximal said burner unit second end and radially inward of said outer diameter of said plurality of vanes, where each at least one burner unit:

(A) defines a first point which is the point along said central axis closest to said first end where a plane perpendicular to said central axis at said point intersects said plurality of vanes of said burner unit swirl mixer;

(B) defines a second point which is the point along said central axis furthest from said first end where a plane perpendicular to said central axis at said point intersects said plurality of vanes of said burner unit swirl mixer; and (C) defines a geometric mid-point along said central axis equidistant from said first point and said second point, wherein:

each first fuel inlet is located at a point between said oxidant inlet and said swirl mixer which intersects with a plane perpendicular to said central axis, and which plane intersects with a point along said central axis between 1 and 2 equivalent circular diameters of said first fuel inlet flow area from said first point, and each second fuel inlet is located at a point between said first fuel inlet and said second end which intersects with a plane perpendicular to said central axis, and which plane intersects with a point along said central axis equal to or less than said inner diameter of said plurality of vanes from said geometric mid-point.

Reference herein to method steps or features is also reference to the system of the present invention adapted or configured to perform such method steps.

The first end may also be referred to as the upstream end, and the second end may be referred to as the downstream end. The terms "upstream" and "downstream" are intended to reflect the relative positions of the components referenced. In particular, the use of "upstream" and "downstream" may reflect the relative positions of components in a fluid flow path or in a process. The phrase "upstream of 'feature X'" (in the context of a feature within the body) means located toward the first end from 'feature X', i.e. between the first end and 'feature X'; "downstream of 'feature X'" (in the context of a feature within the body) means located toward the second end from 'feature X', i.e. between feature X and the second end. Similarly, the first side may be referred to as an upstream side, and the second side may be referred to as a downstream side. The first fuel inlet can also be referred to as an HCV fuel inlet, and the second fuel inlet can also be referred to as an LCV fuel inlet.

Preferably, the hollow longitudinally elongate body defines an inner cavity. More preferably the body is a walled shape that defines an inner volume. Examples of shapes for the hollow longitudinally elongate body include cylinders and tubes, and shapes with a polygonal cross-section. Examples of polygonal cross-sections include quadrilateral (such as rectangular), pentagonal, hexagonal, heptagonal and octagonal cross-sections. The body may extend both along and about said central axis.

As noted above, the body extends along a central axis. In certain embodiments, the central axis may be other than a straight axis. For example, the axis may be curved, or it may be stepped.

As can be seen from the above definition, a fluid flow path is defined from said oxidant inlet to said first volume to said second volume.

The first volume may be considered to be defined between the first end, the burner wall and the body. Similarly, the second volume may be considered to be defined between the burner wall, the second end and the body.

Preferably, the body comprises a body inner surface extending from said burner wall to said second end. Preferably, said second volume is defined between said burner wall, said body inner surface, and said second end.

The second volume can also be referred to as a flame tube, and the two terms are used interchangeably herein.

As stated above, the first end of the at least one burner unit extends outwardly of an opening in the body from the first volume. Thus, the first end of the at least one burner unit does not have to extend from the end wall at the body first end. For example, the first end of the at least one burner unit may extend from a side wall of the body. Where the swirl burner assembly comprises multiple burner units then in some embodiments the portion extending outwardly of an opening in the body from the first volume may be a shared or common part of multiple burner units.

Preferably, said swirl mixer is located at a point between said first fuel inlet and said second fuel inlet which intersects with a plane perpendicular to said central axis, and which plane intersects with a point along said central axis equal to or within one inner diameter of said plurality of vanes from a point which is the point along said central axis furthest from said first end where a plane perpendicular to said central axis at said point intersects with said burner wall.

In certain embodiments, the vanes are formed as part of the burner wall, such that the burner wall is manufactured with the vanes or swirl mixer, or the burner wall is cut or machined to form vanes from the burner wall without the addition of a discrete burner unit.

Since the at least one burner unit extends through an opening in the burner wall, each burner unit first end may be considered to define part of the perimeter of the first volume. Similarly, each burner unit second end may be considered to define part of the perimeter of the second volume. Thus, when the swirl mixer is positioned more toward the first end within the first volume, the first volume is reduced, and when the swirl mixer second side is positioned more toward the second end within the second volume, the second volume is reduced.

Preferably, an at least one burner unit comprises a burner unit outer body which more preferably defines a burner unit inner volume. Thus, the inner volume is contained within (i.e. is a part of) the first volume. Preferably, the burner unit outer body defines at least one opening (an at least one air inlet opening). Preferably, a fluid flow path is defined from said oxidant inlet to said first volume to said burner unit inner volume to said second volume (i.e. from said oxidant inlet to said first volume to said second volume via said inner volume portion of said first volume). Preferably, the first fuel inlet is located within the inner volume.

Unless the context dictates otherwise, reference herein to "an at least one burner unit" and to "at least one burner unit" is preferably to each at least one burner unit and to each burner unit as appropriate.

Preferably, at least one burner unit comprises an outer collar extending through said opening in said burner wall from said first volume toward said second volume, said outer collar having an outer diameter, an inner diameter, a first end and a second end. Preferably, said outer diameter is equal to the diameter of the opening in said burner wall.

Preferably, at least one burner unit comprises an inner collar extending through said opening in said burner wall from said first volume toward said second volume, said inner collar having an outer diameter, an inner diameter, a first end and a second end.

Preferably, the outer collar and inner collar first ends are the ends of the outer and inner collars closest to the swirl burner assembly first end. Similarly, the outer collar and inner collar second ends are preferably the ends of the outer and inner collars closest to the swirl burner assembly second end.

More preferably, said outer collar second end intersects with a plane perpendicular to the central axis and which plane extends between the swirl mixer and the swirl burner assembly second end, and which plane intersects with a point along said central axis equal to or between one inner diameter of the plurality of vanes and half the inner diameter of the plurality of vanes downstream from the geometric mid-point.

More preferably, said outer collar first end intersects with a plane perpendicular to the central axis and which plane extends between the swirl mixer and the swirl burner assembly first end, and which plane intersects with a point at a position equal to or within two outer diameters of the plurality of vanes upstream of the said outer collar second end.

In certain embodiments, part or all of the outer collar may be formed by the burner unit outer body.

More preferably, said inner collar second end intersects with a plane perpendicular to the central axis, and which plane intersects with a point at a position along said central axis and which plane extends between the swirl mixer and the swirl burner assembly second end, and which plane intersects with a point along said central axis equal to or less than half of the inner diameter of the plurality of vanes downstream from the geometric mid-point.

More preferably, said inner collar first end (the part of the inner collar first end closest to the swirl burner assembly first end) is located downstream of the first fuel inlet and upstream of the inner collar second end.

Preferably, the outer diameter of said inner collar is smaller than the inner diameter of said outer collar. More preferably, the inner collar is positioned radially internal to (i.e. radially inwards of) said outer collar.

In certain embodiments, the outer collar is formed as part of the burner wall, in that it is integral to the wall. In such embodiments, the outer collar can still extend toward the body first and/or second end. For instance, the outer collar may be extruded, shaped, pressed or otherwise formed from the burner wall. Similarly, the inner collar may be formed as part of the burner wall.

Preferably, the plurality of vanes are positioned within said outer collar. More preferably, the plurality of vanes extend radially between said outer collar and said inner collar. Preferably, the outer collar inner diameter is equal to the outer diameter of the plurality of vanes and the inner collar outer diameter is equal to the inner diameter of the plurality of vanes.

In some embodiments the plurality of vanes may extend from a single one of said inner collar or said outer collar, such that they are supported by a single collar, in such an embodiment the outer diameter of the plurality of vanes may be smaller than the inner diameter of the outer collar, or the inner diameter of the plurality of vanes may be greater than the outer diameter of the inner collar.

To one of ordinary skill in the art, it will be obvious to manufacture the vanes as part of the inner collar, or as part of the outer collar, or as part of the inner and outer collars, or as part of the outer collar where the outer collar is part of the burner unit, for example as part of a burner unit outer body.

The collars can affect burner characteristics, since they may extend into the second volume further than the plurality of vanes.

Where there is more than one burner unit, preferably each burner unit has an inner collar and an outer collar which extends through the opening in the burner wall for that burner unit.

Preferably, at least one burner unit comprises a first fuel pipe having a first end, a second end, an inner diameter and an outer diameter. Preferably, said first fuel pipe defines said first fuel inlet. Preferably, said first fuel pipe is positioned radially inward of the inner collar outer diameter. More preferably said outer diameter of said first fuel pipe is equal to or less than said inner collar outer diameter.

Preferably, at least one burner unit comprises a second fuel pipe having a first end, a second end, an inner diameter and an outer diameter. Preferably, said second fuel pipe defines said second fuel inlet. Preferably, said second fuel pipe is positioned radially inward of the inner diameter of the plurality of vanes. More preferably, said second fuel pipe is radially inward of the first fuel pipe.

In other embodiments, the second fuel pipe may extend radially inwards from the body to the burner unit. More preferably, said second fuel inlet extends through the second volume from the body to the burner unit.

Preferably, the first and second fuel inlets are located radially inward of the inner diameter of the plurality of vanes.

Preferably, the first and second fuel inlets are aligned along an axis generally parallel to the central axis or are independently aligned along axes generally parallel to the central axis.

Preferably, the outer diameter of the plurality of vanes is between two and four times, more preferably about three times, greater than the inner diameter of the plurality of vanes.

Preferably, said first point is the point along said central axis closest to said first end where a plane perpendicular to said central axis at said point intersects a section of said plurality of vanes (i.e. intersects said plurality of vanes at a point) which is adapted to induce angular momentum in a fluid flowing along said plurality of vanes. Thus, in a burner unit with a plurality of vanes having a section which does not induce angular momentum in a fluid flowing over it (e.g. the vanes having a straight section which does not move radially about an axis, particularly an axis generally parallel to said central axis) and a curved section, the first point is considered to be at the beginning of the curved section.

Within the definition of the present invention, said HCV inlet may be toward the second volume or said LCV inlet may be positioned toward the first volume. Where such repositioning may only be to an extent that the combustion will not be adversely affected, i.e. the swirl burner assembly is no longer effective for its function.

The second volume defined by the burner wall and the second end may be referred to as a flame tube. Preferably, the flame tube is generally cylindrical and has an inner diameter and an outer diameter and is arranged about the central axis. More preferably, the flame tube inner diameter is between 2 and 3 times the outside diameter of the plurality of vanes. More preferably still, the flame tube inner diameter is 2.5 times the outside diameter of the plurality of vanes.

Preferably, at least one of the first fuel inlet and the second fuel inlet is a nozzle. Each at least one nozzle is defined by at least one hole in said fuel inlet wherein the at least one hole may be any shape. The sum of areas of the at least one hole has an equivalent circular diameter to that of a single circular hole. The sum of areas of the at least one hole can also be referred to as a flow area, e.g. a first fuel inlet flow area or second fuel inlet flow area, or a flow area of the first or second fuel inlet.

Such an inlet can be an orifice in said first or said second fuel pipe. Said inlet need not be positioned at said second end of said first or said second pipe, but can be positioned along said pipe. Where said first or second fuel inlet comprises a plurality of openings, the location of the fuel inlet is preferably defined as being, at mean of the flow area weighted average along the central axis.

Preferably, the swirl burner assembly comprises an igniter. Preferably, the igniter is located in the second volume. More preferably, the igniter extends outwardly from the body from the second volume. More particularly it may extend radially outwardly from the body from the second volume, i.e. it may extend in a radially outward direction from the second volume outward of the body. More preferably an ignition end of the igniter is positioned within the second volume. In certain embodiments, the igniter is located beyond the body second end. In certain embodiments, the igniter extends through the burner wall or through a body second end wall.

Preferably, the burner wall has (i.e. defines) at least one air split opening, wherein said air split opening comprises at least one hole (i.e. orifice) extending from the first volume side to the second volume side of the burner wall. More preferably, said at least one air split opening is radially concentric with reference to the outer diameter of the plurality of vanes. More preferably, said at least one air split opening is a continuous hole arranged concentrically.

Although the term hole is used, the hole may take any shape or form by which a channel or opening in the burner wall extending axially from the first volume to the second volume is achieved.

Preferably, said at least one air split opening in said burner wall is positioned radially outwards of said outer diameter of the plurality of vanes. More preferably, said at least one air split opening in said burner wall in positioned radially inwards of said body.

Preferably, when present, the at least one air split opening allows a proportion of oxidant flow to pass from the first volume to the second volume through the at least one hole.

More preferably, the at least one air split opening is adapted so that an oxidant flow through the at least one air split opening converges in the second volume with an oxidant and fuel mixture passing through said at least one burner unit downstream of said at least one burner unit plurality of vanes.

The at least one air split opening in the burner wall results in a different operation of the swirl burner assembly. Instead of all the oxidant and fuel passing into the second volume through the swirl mixer, some oxidant is allowed to pass directly to the second volume with no prior mixing with fuel. This is advantageous in that the oxidant flow through the at least one air split opening in the burner wall provides a flow of oxidant to the swirl burner assembly second end around the ignited fuel. This flow of oxidant creates a barrier (an "oxidant curtain") providing partial separation of the body from the heat of the ignited gases.

In embodiments where said air split opening is be positioned radially further away from said swirl mixer, this allows oxidant flow to be directed along said body thereby encouraging a more laminar flow and creating a more sustainable boundary condition for resisting the heat of the ignited gases.

Preferably, the swirl burner assembly, particularly the at least one air split opening, is adapted or configured so that in use, the oxidant flow through the at least one air split opening is between 5% and 20% of the total oxidant flow passed through the swirl mixer. More preferably, it is between 7.5% and 15%, more preferably between 8.75% and 12.5% of the oxidant flow passed through the swirl mixer.

In certain embodiments, the body comprises a single wall extending from the burner wall to the second end and having an inner surface which defines a body inner surface and thus defines the second volume.

In other embodiments, the body is a multi-walled body, the multiple walls extending from the burner wall to the second end, an inner wall having an inner surface which defines the body inner surface and thus defines the second volume, and an outer wall located outwards of said inner wall. A third volume is defined between said burner wall, said inner wall, said outer wall and said second end. More particularly the third volume is defined between said burner wall, an inner surface of said outer wall, an outer surface of said inner wall, and said second end.

Preferably, the burner wall additionally comprises at least one bypass opening between said first volume and said third volume. Thus, a fluid flow path is defined from said oxidant inlet to said first volume to said at least one bypass opening to said third volume.

Oxidant may be exhausted from the third volume independently or in conjunction with fluids exhausted from the second volume. For example, an exhaust (e.g. a swirl burner body exhaust) may be provided which is in fluid flow communication with the second volume and the third volume. Alternatively, separate exhausts may be provided from the second and third volumes.

Unless the context dictates otherwise, reference herein to an opening is to a hole, channel, opening or passage in a component, and such terms are interchangeable. Each opening may have a shape independently selected from the group consisting of a hole, a channel, and a slot. Each opening may have a cross-sectional shape selected from the group consisting of circle, oval, ellipse, rectangle, reniform (i.e. kidney shaped), and penannular (i.e. almost annular).

Preferably, the at least one bypass opening in the burner wall is arranged concentric with reference to the central axis or with reference to the outer diameter of the plurality of vanes. More preferably, the at least one bypass opening is a continuous hole or a set of holes arranged concentrically.

Preferably, when present, the at least one bypass opening, allows a proportion of oxidant to flow from the first volume to the second end without flowing through the second volume.

The at least one bypass opening and the flow path to the second end through the third volume allows a proportion of inlet oxidant to bypass the at least one burner unit. This allows greater oxidant flow through the first volume without adversely affecting combustion (i.e. keeping the lambda at the at least one burner unit within an acceptable range). This provides the significant advantage that the swirl burner assembly is able to operate over a wider range of lambda values (the lambda value being calculated on the basis of oxidant flow through the oxidant inlet into the first volume, and fuel flow through the first and second fuel inlets).

Preferably, each first fuel inlet is in fluid flow communication with an HCV fuel source. Preferably, each second fuel inlet is in fluid flow communication with an LCV fuel source.

Preferably, the swirl burner assembly is a burner for a fuel cell system. More preferably, the swirl burner assembly is a tail-gas burner, where a tail-gas burner is a burner suitable for burning anode and cathode off-gases from a fuel cell stack.

Preferably, the swirl burner assembly is integral with a fuel cell assembly or system, more preferably with a solid oxide fuel cell system, more preferably still with an intermediate temperature solid oxide fuel cell system.

Preferably, the swirl burner assembly is in fluid flow communication with a fuel cell system, more preferably with a fuel cell stack of a fuel cell system. Preferably, the oxidant inlet is in fluid flow communication with an oxidant source. More preferably, the oxidant inlet is in fluid flow communication with at least one fuel cell stack cathode off-gas outlet. Preferably the at least one burner unit is in fluid flow communication with at least one fuel cell stack anode off-gas outlet. More preferably the first fuel inlet of at least one burner unit is in fluid flow communication with at least one fuel source for a fuel cell system. Preferably the second fuel inlet of at least one burner unit is in fluid flow communication with at least one fuel cell stack anode off-gas outlet.

Preferably, the fuel cell system is a solid oxide fuel cell (SOFC) system. More preferably the fuel cell system is an intermediate temperature sold oxide fuel cell (IT-SOFC) system.

The swirl burner assembly will be formed from material known in the art, e.g. metal alloys for pipes and walls and glass for the tubes. Due to the high temperatures, the materials must have high temperature resistance.

Also provided according to the present invention is a method of operating a swirl burner assembly according to the present invention, the method comprising the steps of:
  (i) supplying an oxidant to said oxidant inlet;
  (ii) supplying a fuel comprising at least one of an HCV fuel to said first fuel inlet and an LCV fuel to said second fuel inlet; and
  (iii) combusting said fuel in said second volume.

Preferably, when HCV fuel is supplied to said HCV fuel inlet, said oxidant and said HCV fuel flow converge in said first volume between the first fuel inlet and the swirl mixer, and when LCV fuel is supplied to said LCV fuel inlet, said oxidant and said LCV fuel flow converge in the second volume between the swirl mixer and the second end.

As detailed above, preferably, the HCV fuel is a fuel that comprises of methane, ethane or propane or any combination therein. More preferably, the HCV fuel is considered to be fuels with a Wobbe index between 36 and 85 $MJ/m^3$. A typical HCV fuel is natural gas—the Wobbe index for natural gas is 48 to 54 $MJ/m^3$.

Preferably the LCV fuel is a fuel which has a high fraction of $H_2$, CO or $CO_2$. More preferably the Wobbe index for a LCV fuel is typically between 18 and 35 $MJ/m^3$, more preferably 22 and 26.53 $MJ/m^3$.

Preferably, the oxidant is air or cathode off-gas from an operating fuel cell (such oxidant then being partially oxygen depleted as compared to air). More preferably, said oxidant is cathode off-gas from an operating solid oxide fuel cell, more preferably an operating intermediate temperature solid oxide fuel cell.

LCV fuel can be formed by the reforming of hydrocarbon fuels, such as an HCV fuel, and the reforming process can include treatment with an oxidant such as air or steam. The LCV may undergo electrochemical reaction in the fuel cell before entering the swirl burner assembly. SOFC fuel cell stack anode off-gases can be considered to be an LCV fuel.

Preferably, reformation of hydrocarbon fuels occurs in a fuel cell system. More preferably the swirl burner assembly is integral with a fuel cell system and burns the anode off gases produced by the fuel cell system.

Preferably, the HCV fuel and/or LCV fuel is ignited or combusted in the second volume by an igniter. More preferably the ignition occurs downstream of the plurality of vanes. Preferably, the step of combusting said fuel in said second volume comprises igniting and combusting said fuel in said second volume.

Preferably, at least one of the first volume and the second volume is a sealed or enclosed volume. More preferably, the burner unit forms a seal when it extends outward from an opening in the said body.

Preferably, the combusted gases flow or are exhausted from the second volume through the second end (i.e. the downstream end) of the body.

The fact that the burner wall separates the first volume from the second volume allows combustion of the fuel to occur and to be constrained to the second volume. This allows the control of mixing of the different fuels in specific parts of the swirl burner assembly prior to combustion. This allows for different amounts of mixing and different intensities of mixing in particular because all oxidant and HCV fuel must pass through the plurality of vanes to reach the flame tube where there is no bypass or holes present in the burner wall.

The oxidant and HCV fuel flow through the plurality of vanes and flow into the second volume. The converging of the oxidant flow and HCV fuel flow prior to passing into the flame tube causes mixing of the two flows. The flow through the plurality of vanes causes further mixing of the two flows still all prior to the flame tube where combustion is confined.

Combustion of the mix of oxidant and fuel occurs in the second volume, and the products from this combustion are exhausted from the swirl burner assembly. Preferably, the heat produced from this process is used to heat the fuel cell stack and fuel cell system.

Preferably, the flow of the oxidant and at least one HCV fuel and LCV fuel are such that the oxidant to fuel ratio (lambda) of the gas flow to the swirl burner assembly is between 1 and 20 lambda, more preferably between 1 and 18 lambda, more preferably between 1 and 10 lambda or between 2 and 18 lambda. More preferably, when the swirl burner has a flow of oxidant and HCV fuel (with no LCV fuel) the swirl burner assembly operates with an oxidant to fuel ratio of less than 5 lambda.

The relevant measurement of lambda is that at the burner inlets, i.e. the oxidant, HCV and LCV inlets.

In embodiments where the swirl burner assembly is integral with a fuel cell system, it is advantageous for the swirl burner assembly to be able to operate over a large lambda range since the oxidant flow, and, to an extent, the LCV flow to the swirl burner assembly is dictated by the fuel cell stack and the electrical current draw upon it. As such, a large lambda operating range where the swirl burner assembly maintains a stable combustion will (a) prevent the swirl burner assembly from dictating the fuel cell stack operation by limiting oxidant flow, and/or (b) allow the flow of all cathode and anode off-gases to the swirl burner assembly.

Preferably, the at least one bypass opening and/or the at least one air split opening is adapted to result in the doubling of the lambda range of the oxidant and the fuel (the fuel passing through the first and second fuel inlets) fed to the swirl burner assembly.

Preferably, the at least one bypass opening and/or the at least one air split opening is adapted to the result in the flow of the oxidant and the fuel fed to the swirl burner at an oxidant to fuel ratio of 2 to 18 lambda.

The equivalent diameter of the at least one nozzle of the first fuel inlet or second fuel inlet may be defined by the required velocity through them. Preferably, the velocity of the HCV fuel through the first fuel inlet of the at least one burner unit is between 3 and 6 m/s. More preferably, the velocity of the LCV fuel through the second fuel inlet of the at least one burner unit is between 10 and 35 m/s.

The term "comprising" as used herein to specify the inclusion of components also includes embodiments in which no further components are present.

Particular and preferred aspects of the invention are set out in the accompanying independent claims. Combinations of features from the dependent claims may be combined with features of the independent claims as desired and appropriate and not merely as explicitly set out in the claims.

BRIEF DESCRIPTION OF THE DRAWINGS

For convenience, FIGS. 1A and 1B are shown with the igniter rotated by 90 degrees and the air inlet rotated slightly to ensure that the general arrangement of parts is clearly shown.

FIG. 3 shows a partial cut-away plan view schematic of a swirl burner assembly according to the present invention and further comprising an air curtain feature;

FIG. 4 shows a detailed schematic of the feature marked as 'B' in FIG. 3;

FIG. 5 shows a partial cut-away plan view schematic of a swirl burner assembly according to the present invention and further comprising a bypass feature;

FIG. 6 shows a detailed schematic of the feature marked as 'C' in FIG. 5;

A fully and enabling disclosure of the present invention, including the best mode thereof, to one of ordinary skill in the art, is set forth more particularly in the remainder of the specification. Reference now will be made in detail to the embodiments of the invention, one or more examples of which are set forth below. Each example is provided by way of explanation of the invention, not limitation of the invention.

It will be apparent to those of ordinary skill in the art that various modifications and variations can be made in the present invention without departing from the scope of the invention. For instance, features described as part of one embodiment can be used on another embodiment to yield a still further embodiment. Thus, it is intended that the present invention cover such modifications and variations as come within the scope of the appended claims and their equivalents.

Other objects, features, and aspects of the present invention are disclosed in the remainder of the specification. It is to be understood by one of ordinary skill in the art that the present discussion is a description of exemplary embodiments only and is not intended as limiting the broader aspects of the present invention, which broader aspects are embodied in the exemplary constructions.

A listing of reference symbols used herein is given at the end of the description. Repeat use of reference symbols in the present specification and drawings is intended to represent the same or analogous features or elements.

For the purposes of this description, the term burner, swirl burner and swirl burner assembly are to be understood to refer to the swirl burner assembly of the invention, and where appropriate, they are readily interchangeable.

In the specific embodiment below, the fuel cell system is an IT-SOFC (intermediate temperature solid oxide fuel cell) system comprising at least one fuel cell stack, where the fuel cells of the at least one fuel cell stack typically operate in the range 450-650 deg C. In other embodiments, other fuel cell systems are used with corresponding operational temperature ranges.

Figure 1:
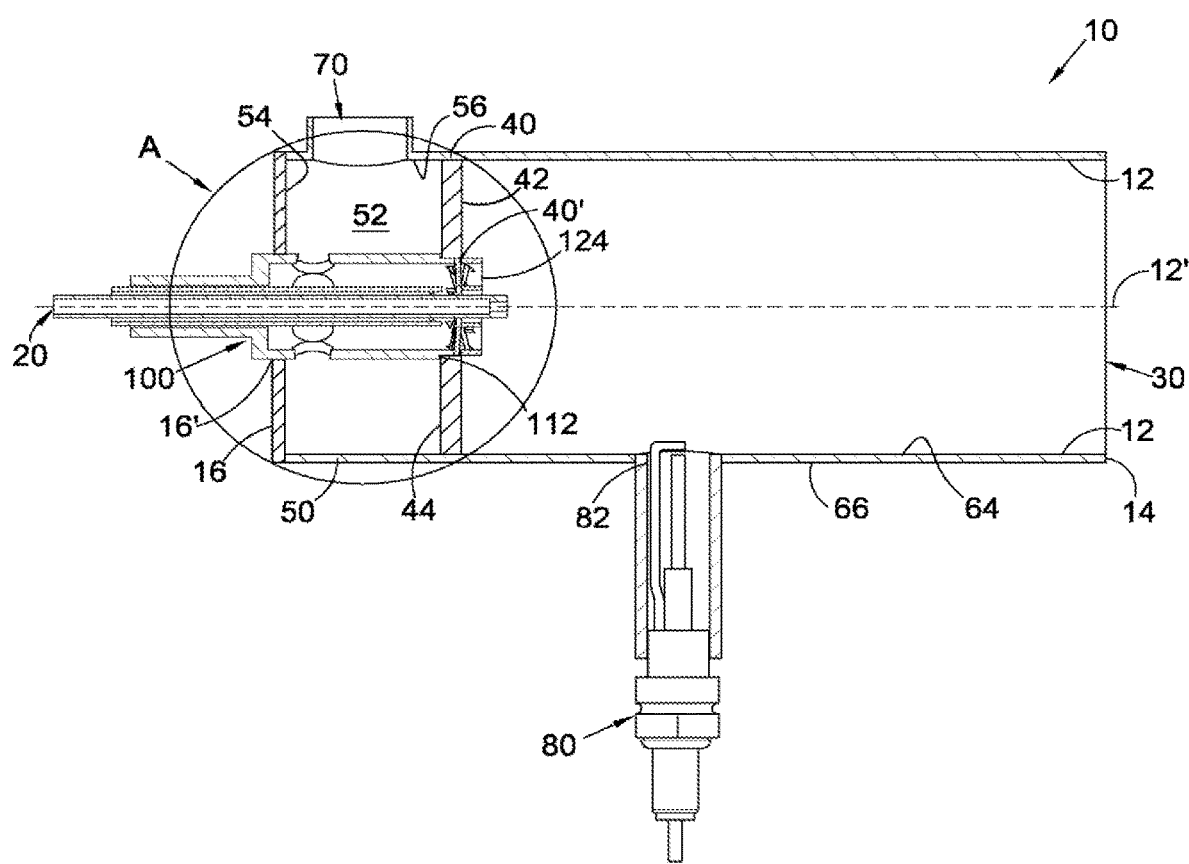
FIG. 1 shows a partial cut-away plan view schematic of a swirl burner assembly according to the present invention.

Referring to FIG. 1, a swirl burner assembly 10 is shown. The swirl burner assembly 10 comprises a generally cylindrical (i.e. predominantly cylindrical) swirl burner body 12 having a central axis 12', swirl burner body top end wall 16 and swirl burner body bottom end wall 14, where swirl burner body bottom end wall 14 defines swirl burner body downstream end 30.

Although the term "swirl burner top end wall 16" has been used throughout the description, this part is also referred to as the "swirl burner first end". Likewise, "swirl burner bottom end wall 14" is also referred to as the "swirl burner second end".

Swirl burner assembly 10 is segmented by a burner wall 40 which intersects the body 12 radially across its cylindrical shape. Burner wall 40 has a downstream face 42 which faces the swirl burner body downstream end 30. Burner wall 40 also has an upstream face 44 which faces swirl burner body top end wall 16. The portion of body 12 between body top end wall 16 and burner wall 40 defines a first section referred to herein as burner tube 50. The portion of body 12 between burner wall 40 and body bottom end wall 14 defines a second section which is generally cylindrical and has a body inner surface 64 and a body outer surface 66.

First volume 52 is defined by (i.e. is defined between) burner wall upstream face 44, inner face 54 of swirl burner body top end wall 16, and burner tube inner surface 56. Similarly, second volume 62 is defined by (i.e. is defined between) body inner surface 64, swirl burner body bottom end wall 14 and burner wall downstream face 42.

Burner unit 100 has a burner unit first end 20 and a burner unit second end 124. Burner unit first end 20 (the upstream end) protrudes from the swirl burner assembly 10 and particularly from the first volume 52 through opening 16' in swirl burner body top end wall 16. Burner unit second end 124 (the downstream end) protrudes from first volume 52 to second volume 62 through opening 40' in burner wall 40.

Burner wall 40 and swirl burner body top end wall 16 have openings (opening 40' and opening 16' respectively) defined in them to allow the passage or placement of burner unit 100 through them. This allows the manufacture of the burner unit 100 separate to swirl burner body 12. Therefore, assembly simply requires the placement of burner unit 100 through opening 16' in swirl burner body top end wall 16 and opening 40' in burner wall 40.

Shoulder 112 of burner unit 100 abuts burner wall 40 and prevents burner unit 100 progressing further into swirl burner body 12 and second volume 62. Burner unit 100 is then constrained in place by the joining of burner unit 100 to swirl burner body 12 at swirl burner body top end wall 16 by welding. In other embodiments other joining techniques are used, including soldering, brazing, tacking or any other joining techniques known in the art. This results in the creation of a seal between burner unit 100 and swirl burner body top end wall 16 such that the first volume (first volume 52) is enclosed. Similarly, with shoulder 112 abutting burner wall 40, a seal is effected between them.

Although a single burner unit is described below, in other embodiments (not shown) multiple burner units 100 are used where they pass through the swirl burner body 12 (for example through swirl burner body top end wall 16), through first volume 52, through burner wall 40 and into second volume 62.

In the swirl burner assembly 10 as shown in FIG. 1, burner unit 100 passes through first volume 52 and is positioned mostly equidistant from burner tube inner surface 56. Part of the burner tube inner surface 56 has an opening to allow the feeding of air through air inlet 70 through the swirl burner body 12 into the first volume 52. Similarly passing through the swirl burner body 12 is igniter opening 82 through which igniter 80 protrudes into second volume 62.

The positioning of igniter 80 and air inlet 70 are shown in FIG. 1 to be opposed to one another across an axis of swirl burner body 12. In other embodiments (not shown) the positioning of air inlet 70 and igniter 80 can be varied.

Air is fed into the first volume 52, and initial ignition of a fuel occurs in the second volume 62 due to a sparking of igniter 80.

Second volume 62 defines a flame tube, wherein the combustion of gases is to occur.

Figure 1A:
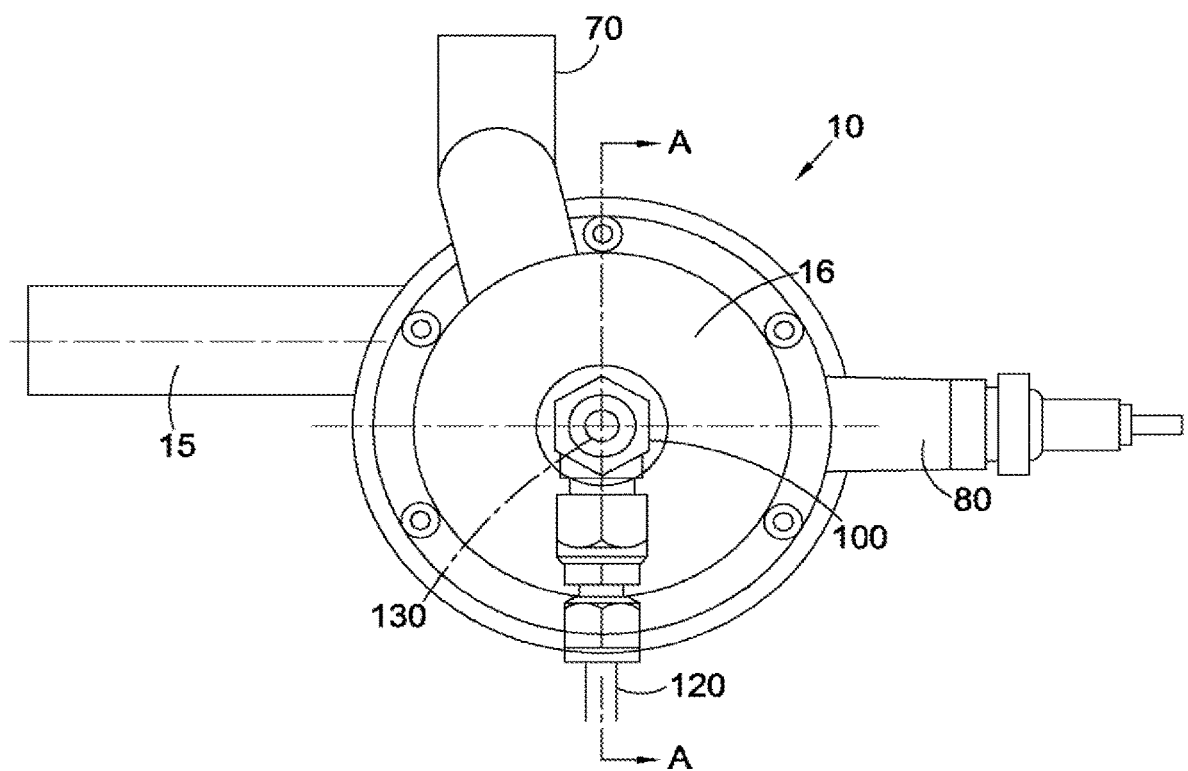
FIG. 1A shows a schematic illustration of a first end view of the swirl burner assembly of FIG. 1 (FIG. 1 is taken along line A-A of FIG. 1A)
Figure 1B:
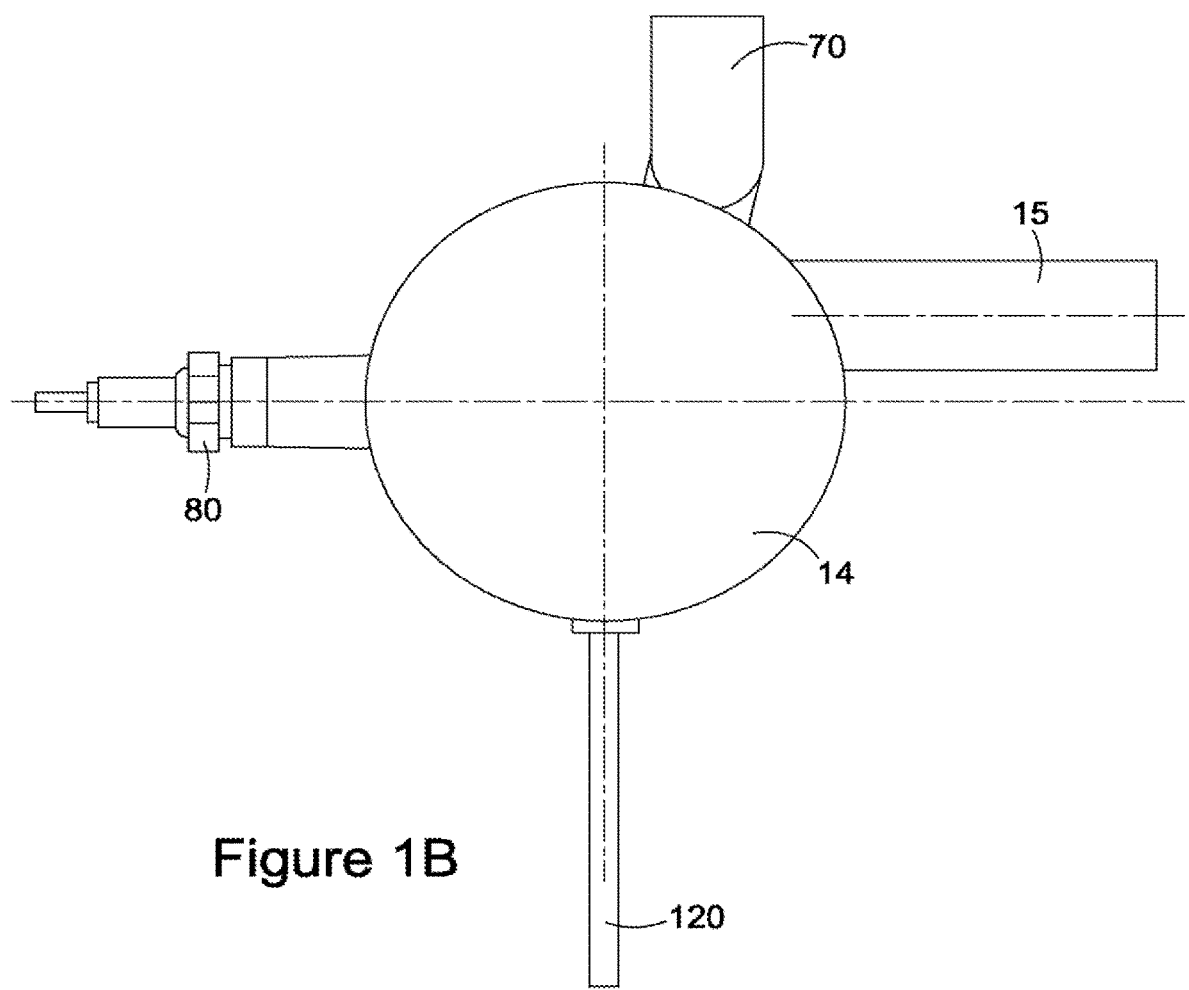
FIG. 1B shows a schematic illustration of a second end view of the swirl burner assembly of FIG. 1.

Swirl burner body exhaust 15 (which is positioned proximal swirl burner body bottom end wall 14 and which exhausts gases from, i.e. is in fluid flow communication with, second volume 62) is shown in FIGS. 1A and 1B. For simplicity and convenience it is not shown in FIG. 1. For convenience, FIGS. 1A and 1B are shown with igniter 80 rotated by 90 degrees and air inlet 70 rotated slightly to ensure that the general arrangement of parts is clearly shown.

Figure 2:
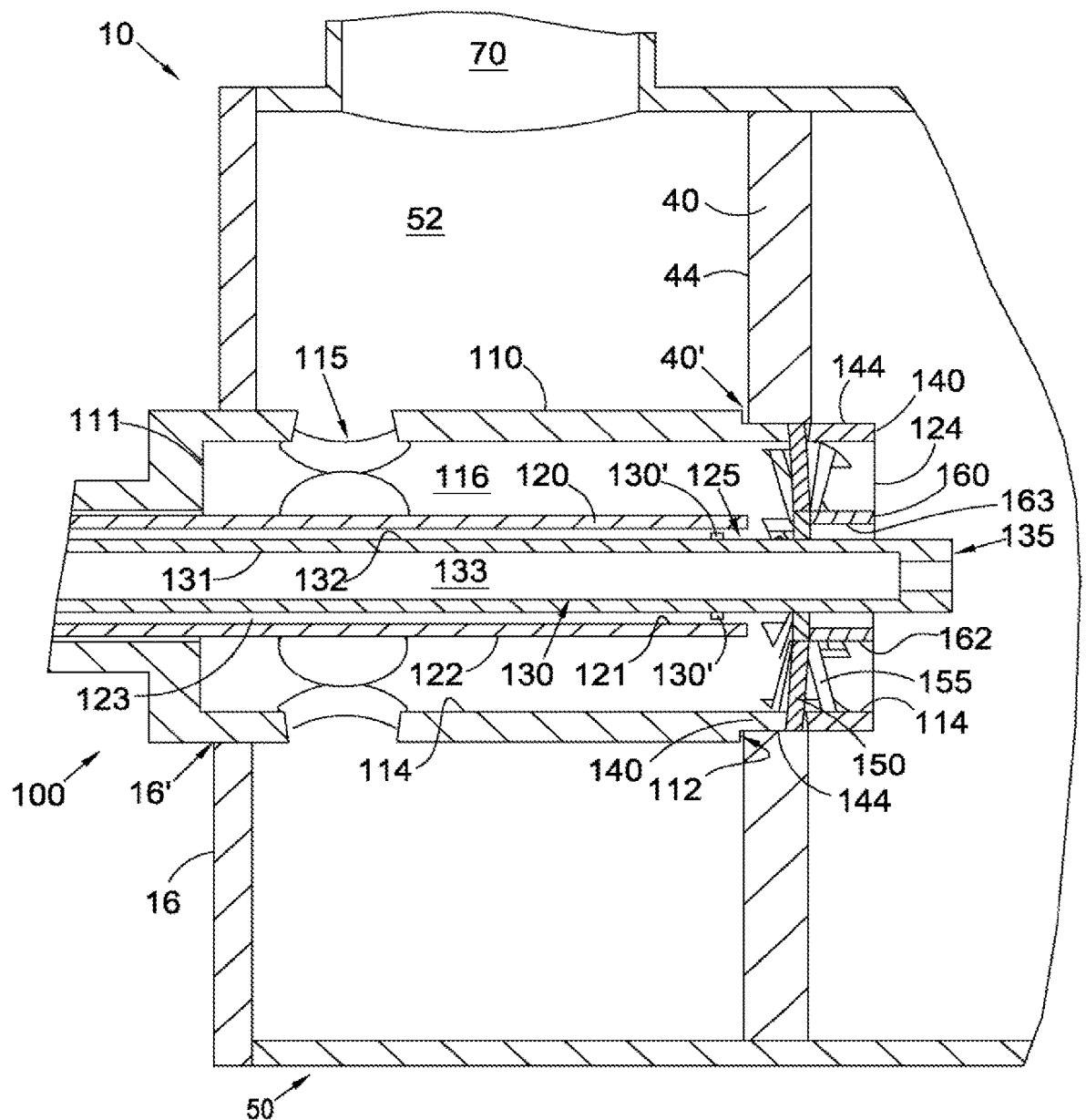
FIG. 2 shows a detailed schematic of the feature marked as 'A' in FIG. 1.

Referring to FIG. 2, a more detailed view of the swirl burner assembly 10 and burner unit 100 is shown. The portion of burner unit 100 passing through first volume 52 has a burner unit outer body 110 which is mostly cylindrical and is aligned in the same cylindrical direction (on central axis 12') as swirl burner body 12. Burner unit 100 has a burner unit top inner surface 111 which faces in the general direction of burner wall 40. The end of the burner unit 100 which passes through opening 40' in burner wall 40 into second volume 62 is burner unit second end 124 (i.e. a burner unit bottom end). Burner unit outer body 110 is a walled body and has a thickness. The inner surface of burner unit outer body 110 is inner face 114. Burner unit inner volume 116 is defined by (i.e. defined between) inner face 114, burner unit top inner surface 111 and burner unit second end 124.

Burner unit outer body 110 protrudes through opening 40' in burner wall 40 into second volume 62. Where burner unit outer body 110 protrudes through burner wall 40, burner unit outer body 110 has shoulder 112. Shoulder 112 is stepped remote from burner unit first end 20 such that said wall thickness of burner unit outer body 110 is reduced (in the assembled swirl burner assembly 10, this is at the point where the burner unit 100 reaches the burner wall downstream face (42: FIG. 1) before protruding through burner wall 40). The portion of burner unit outer body 110 with a reduced thickness wall is outer collar 140, where outer collar 140 shares the same inner face 114 and has outer collar outer surface 144. Outer collar 140 protrudes through burner wall 40 into second volume 62 as far as the burner unit second end 124.

Shoulder 112 is restrained against burner wall downstream face (42: FIG. 1), this, advantageously, prevents shoulder 112 from passing through burner wall upstream face 44 when burner unit 100 is positioned through the opening in the burner wall 40 and the swirl burner body top end wall 16. When assembling the swirl burner assembly, this allows the simple insertion of burner unit 100 into swirl burner body 12, without the need for measurement of how far it should be positioned through first volume 52. This allows the machining of burner unit 100 and positioning of shoulder 112 to define the position of burner unit 100 and results in a more uniform positioning of burner units 100 relative to the swirl burner body 12 regardless the number of swirl burner assemblies 10 that are manufactured. It also results in a faster assembly process of a swirl burner assembly 10, since no additional measurements is required to position the burner unit 100 if the manufacturing is uniform.

Burner unit outer body 110 has at least one air inlet hole 115 (in this embodiment, a plurality of air inlet holes 115) adjoining first volume 52 and burner unit inner volume 116 through inner face 114. These air inlet holes 115 allow the passage of gases from first volume 52 into burner unit inner volume 116 (or in an opposite direction, however, the operation of the swirl burner assembly 10 should discourage this). Air inlet holes 115 are cylindrical in shape and they are arranged around the circumference of the cylindrical shape of the outer body 110. In other embodiments (not shown) other geometries of shapes are possible for the air inlet holes 115.

Aside from air inlet holes 115, first volume 52 is normally sealed from burner unit inner volume 116 within it. This ensures that air from air inlet 70 must travel through air inlet holes 115 before flowing into second volume 62.

Running parallel and positioned radially internal to burner unit outer body 110 is HCV fuel tube 120. HCV fuel tube 120 protrudes through burner unit top inner surface 111 within burner unit 100 into burner unit inner volume 116. HCV fuel tube 120 is a walled cylinder with HCV fuel tube inner surface 121 and HCV fuel tube outer surface 122. At the downstream end of HCV fuel tube 120 is HCV inlet 125.

Running parallel and positioned radially internal to the HCV fuel tube 120 is the LCV fuel tube 130. Fingers 130' extend from LCV fuel tube 130 and centralise it within HCV fuel tube 120. The LCV fuel tube 130 protrudes through burner unit top inner surface 111 passes through the HCV tube internal volume 123, through HCV inlet 125, through burner unit second end 124 (through opening 40' in burner wall 40) and into second volume 62. LCV fuel tube 130 is predominantly a walled cylinder with inner surface 131 and outer surface 132. At the downstream end of LCV fuel tube 130 is LCV inlet 135.

HCV tube internal volume 123 is defined by (i.e. defined between) HCV fuel tube inner surface 121, LCV tube outer surface 132, HCV inlet 125 and burner unit first end 20. LCV tube internal volume 133 is defined by (i.e. defined between) LCV tube inner surface 131, LCV inlet 135 and burner unit first end 20. Although not shown in the figures, the end of the HCV fuel tube 120 which continues in the upstream direction will be connected to an HCV fuel supply, in particular referring to FIGS. 1A and 1B it can be seen that HCV fuel tube 120 is shown to approach swirl burner assembly 10 from a direction perpendicular to burner unit 100 before reaching burner unit first end 20. Likewise, the end of the LCV fuel tube 130 which continues in an upstream direction will be connected to an LCV fuel supply.

HCV inlet 125 is positioned within the burner unit inner volume 116, upstream of burner wall 40, and LCV inlet 135 is positioned in second volume 62. HCV inlet 125 is on a radial plane with shoulder 112, i.e. a plane perpendicular to the axis of the cylinder of swirl burner body 12. LCV inlet 135 is further in the downstream direction, i.e. further toward swirl burner body downstream end 30 than the burner unit second end 124.

LCV fuel tube 130 has no opening leading directly to HCV fuel tube inner volume 123. That is to say that HCV tube internal volume 123 is sealed aside from the opening at HCV inlet 125 which is an opening to burner unit inner volume 116. Likewise, the only opening within swirl burner assembly 10 for LCV fuel tube 130 is the opening at LCV inlet 135 into second volume 62, i.e. LCV tube internal volume 133 is sealed aside from LCV inlet 135. As previously discussed, although not shown, the ends of HCV fuel tube 120 and LCV fuel tube 130 continuing in the upstream direction will be connected to appropriate fuel supplies.

Such sealing ensures that there is no mixing of the flows through the fuel pipes or the air within the internal volumes of each pipe. In operation there will be a flow through the pipes in the downstream direction which will further ensure that no flow of fuel or air can flow back down the pipes when there is a flow due to the pressure of the flow.

Downstream of HCV fuel inlet 125, i.e. further toward swirl burner body downstream end 30 and upstream of LCV fuel inlet 135, i.e. further away from swirl burner body downstream end 30 is swirl mixer 150. Swirl mixer 150 has vanes 155 for directing a flow which passes through them. Vanes 155 extend from inner face 114 of outer collar 140 to inner collar 160, and more specifically inner collar outer surface 162. Inner collar 160 is positioned inward of outer collar 140, outward of the LCV fuel tube 130 and extends from the centre of the swirl mixer 150 in a downstream direction toward swirl burner body downstream end 30. The inner collar 160 extends no further in the downstream direction than the burner unit second end 124, which is the same as the outer collar 140. The LCV fuel tube 130 passes between the inner collar inner surface 163.

Swirl mixer 150 is an axial-swirl swirl mixer. Vanes 155 are any number of vanes which influence the flow that passes through them, such that they cause an axial-swirl. The axial-swirl is important for reducing the flame length since a recirculation zone is created within the flame tube (i.e. second volume 62).

Outer collar 140 and inner collar 160 advantageously have an effect on the flow of oxidant and fuel into second volume 62, and in the positioning of the recirculation zone formed by swirl mixer 150. This results in an improved swirl for reducing the flame length and controls the flame seat such that it is close to swirl mixer 150 but not exposed to it. This protects vanes 155 and LCV inlet 135 from being exposed to direct combustion thus preventing deformation such as pitting on the vane surface or inlet surface.

Referring to FIGS. 3 and 4, swirl burner assembly 200 is shown, which is similar to that of FIGS. 1 and 2. However, passing through burner wall 40, there are air split openings 210. Air split openings 210 are through-holes arranged radially around swirl mixer 150.

Air split opening 210 which adjoins second volume 62 to first volume 52 allows the air flow from air inlet 70 to pass to second volume 62 without passing through swirl mixer 150, and, when there is flow through HCV fuel tube 130, there will be limited mixing in second volume 62 of air which passes through air split opening 210 with the HCV fuel through HCV fuel tube 130.

Such a feature allows the air which flows through air split opening 210 to form an air curtain along body inner surface 64. The air curtain provides a boundary between the combustion and body inner surface 64. This air curtain can be used where it is preferred to reduce the temperature of body inner surface 64 and consequently body outer surface 66.

The air split openings 210 are configured so that about 10% of the total flow through air inlet 70 passes through them.

Referring to FIGS. 5 and 6, there is provided swirl burner assembly 300 similar to that seen in FIGS. 3 and 4 where swirl burner assembly 300 is a multi-walled body. Extending from burner wall 40 to swirl burner body bottom end wall 14 is inner wall 360 having inner wall inner surface 364 (i.e. swirl burner body 12 inner surface) and inner wall outer surface 366. Second volume 362 is defined by (i.e. defined between) swirl burner body bottom end wall 14, burner wall 40 and inner wall 360. Outer wall 310 has outer wall inner surface 361 and extends from burner wall 40 to swirl burner body bottom end wall 14 and is outward of inner wall 360. Third volume 363 is defined by (i.e. defined between) burner wall 40, swirl burner body bottom end wall 14, inner wall outer surface 366 and outer wall inner surface 361.

Second volume 362 is a flame tube, i.e. combustion of gases occurs in this volume.

Through burner wall 40 radially outward inner wall outer surface 366 and radially inward of outer wall inner surface 361 there is bypass opening 320.

Air from air inlet 70 within the first volume 52 may pass through bypass opening 320 and into third volume 363. Inner wall 360 prevents the movement of the bypass air into the combustion zone (i.e. second volume 362), and no mixing of the fuel from the fuel inlets and the air in third volume 363 occurs. Mixing of the bypass air and burner combustion products may occur in a downstream direction of second volume 362 and third volume 363, i.e. downstream of body bottom end wall 14.

This feature is known as an air bypass. Such a feature allows the complete bypass of air through the third volume 363 with no interference with the combustion of the fuel. This may be useful where the swirl burner assembly 10 is required to function with an air-fuel ratio greater than the burner unit 100 is designed for, and, as such, the air can be bypassed through the third volume 363, yet emissions will still be within design limits.

This can allow the swirl burner assembly 10 to function with much higher air to fuel ratio, such as from 2 to 18 lambda.

In some embodiments (not shown) the bypass of air need not be a permanent feature, but bypass opening 320 can be enabled as required, for instance by the opening of bypass opening 320 in burner wall 40. Therefore, the operating mode may dictate if the bypass is required.

FIG. 5 shows that the igniter opening 82 for swirl burner assembly 300 protrudes through third volume 363, such that the igniter 80 is positioned within the second volume 362. The extension of the igniter opening 82 is necessary to allow the igniter 80 to be able to cause a spark in the same volume as the combustible gases (i.e. to form a flame tube).

Figure 7:
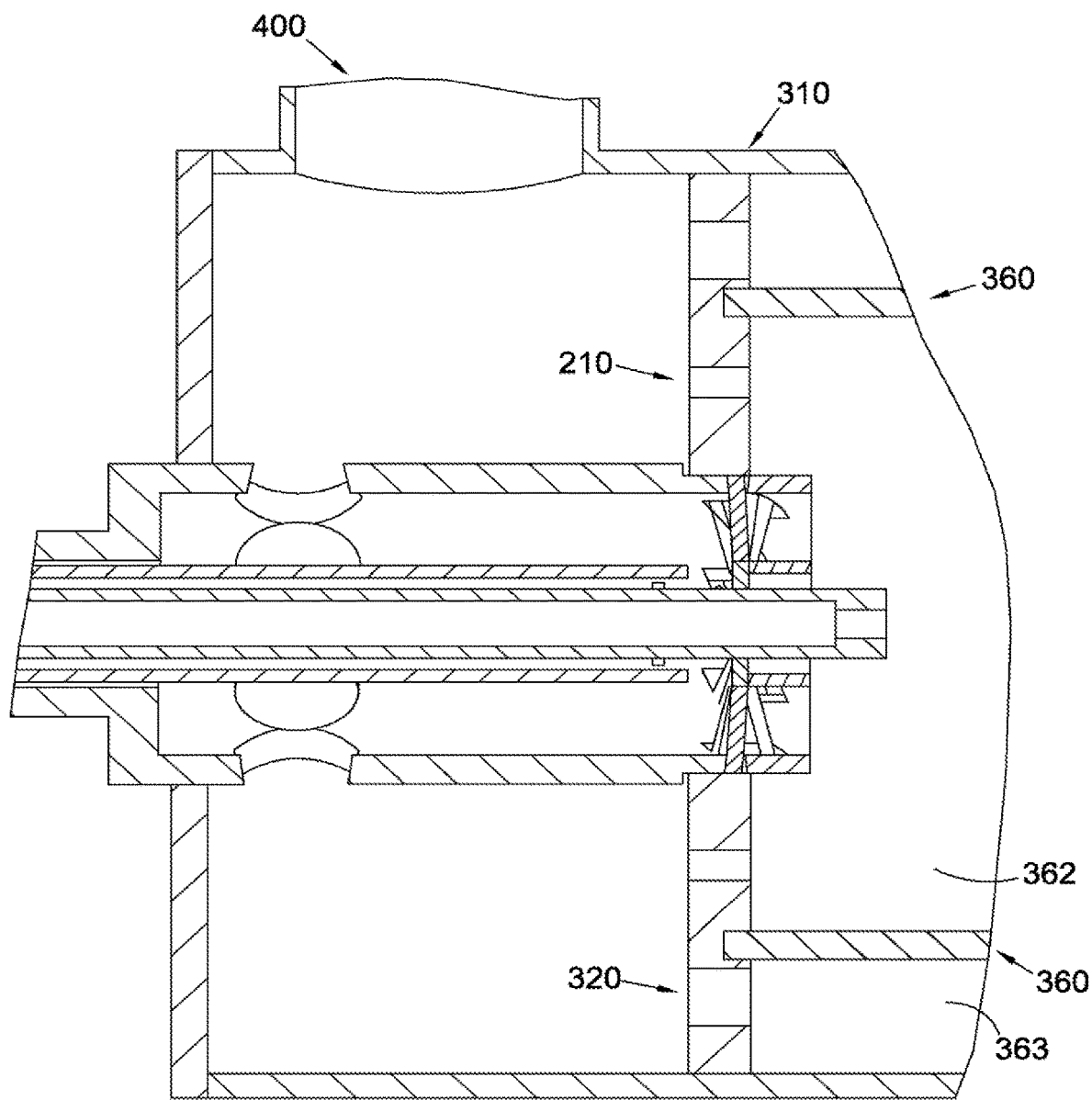
FIG. 7 shows a detailed partial cut-away plan view schematic of a swirl burner assembly according to the present invention comprising an air curtain and bypass feature.

FIG. 7 shows a swirl burner assembly 400 similar to that as hereinbefore described, incorporating both the air split opening feature (for the air curtain) and the bypass feature. Thus, third volume 363 is provided, and a plurality of air split openings 210, thus combining the features in a single burner. The presence of bypass opening 320 means that about 5% of the total flow through air inlet 70 passes through air split openings 210.

The air flow through third volume 363 has the secondary effect of cooling the inner wall 360. However, where additional cooling is required, the air curtain provided by air split opening 210 can be combined with bypass opening 320 as shown in FIG. 7, thereby cooling inner wall 360 by the flow of air over inner wall outer surface (366: FIG. 5) and inner wall inner surface (364: FIG. 5).

The temperature at the burner outlet is measured downstream of the combustion zone, i.e. in a downstream direction from second volume 62 beyond swirl burner body bottom end wall 14. In the configurations where an air bypass is utilised, the temperature at the burner outlet is the temperature of the combined flow of exhaust gases from the second volume and third volume. In the configurations where an air bypass is utilised, the mixing of the bypass air and combustion products may occur downstream of swirl burner body downstream end 30.

When used in a fuel cell system, the burner has four modes of operation:

1) Warm-Up, Non-Reforming:

Where the fuel cell system is cold, it is necessary to heat the stack prior to reaching the operational state. This initial phase raises the temperature of the fuel cell stack outlet to greater than 275 deg C., more preferably 300 deg C. The fuel may be gaseous or vaporised, but in this mode it is HCV fuel which is directly fed to the burner.

Considering swirl burner assembly 10 of FIGS. 1 and 2, in this mode, the HCV fuel is fed into the burner through HCV fuel tube 120 of the burner unit 100. The HCV fuel exits HCV fuel tube 120 at HCV inlet 125. Simultaneous to this operation, air is fed into first volume 52 through air inlet 70. The air inside this volume passes through air inlet holes 115 into burner unit inner volume 116 and flows in the downstream direction toward swirl burner body downstream end 30.

Prior to reaching the swirl mixer 150, i.e. upstream of swirl mixer 150, the HCV fuel and the air are exposed to one another for the first time since entering swirl burner body 12. It is here that initial pre-mixing of the HCV fuel and the air takes place. The HCV fuel and air mixture passes through swirl mixer 150 and the greatest degree of mixing between the HCV fuel and the air occurs through swirl mixer 150 and just into the second volume 62. This area just downstream of the swirl mixer 150 is the mixing zone. A high degree of mixing of the HCV fuel with the air is important to allow complete combustion and reduce the amount of unwanted emissions, such as CO and $NO_x$.

Although the term 'air' has been used, 'oxidant' is also a commonly used term to describe the oxygen carrying medium, along with other terms used in the art. As such air and oxidant are interchangeable for the purposes of this specification.

The mixture of HCV fuel and air is then ignited via igniter 80. Swirl mixer 150 is an axial-swirler, which results in a reverse flow region or recirculation zone within the second volume 62. The recirculation zone is such that it impacts not only the combustion zone, but also the mixing zone. This has a number of benefits: ideally combustion of the HCV fuel mix should occur in this zone since the mixing will be most intense; also this reverse flow has the effect of reducing the length of the flame. As a result of the recirculation zone, the flame seat is just downstream of the swirl mixer 150.

During this operation mode, the air flow rate is controlled by the control system which, amongst other measurements, measures the inlet temperature to the burner. The HCV fuel flow is controlled by the control system using a proportional control valve which varies the HCV fuel flow rate according to the temperature at the burner downstream end. The air flow rate through the burner in this mode can vary from 70 to 116 SLM. The HCV fuel flow rate is expected to be between 0.8 to 6 SLM. The air-fuel equivalence ratio (lambda) may be equal to or less than 4. In further arrangements, however, the air flow rate through the burner in this mode may vary from 70 to 300 SLM. Likewise, in further arrangements the HCV fuel flow rate may be between 0.8 to 8 SLM.

The varying of the arrangement and positioning of HCV fuel inlet 125 along with the size of the holes in the inlet can have an effect on the combustion and functioning of the burner such as producing different emissions which are beyond the regulated limits.

2) Warm-Up. Reforming.

The second mode of operation for swirl burner assembly 10 occurs at fuel cell stack temperatures greater than 275 deg C., more preferably 300 deg C. This mode transitions the fuel from a directly fed HCV fuel to a LCV fuel from the fuel cell stack. That is to say that the LCV fuel may be a reformate gas or anode off gas from the reaction of the fuel cell.

The LCV fuel is fed into swirl burner assembly 10 through LCV fuel tube 130. This LCV fuel tube 130 passes through the centre of the inner diameter of swirl mixer 150 and into second volume 62. It is only at this point that the LCV fuel is fed into second volume 62 through LCV inlet 135. Notably this is downstream of the flame seat of the HCV fuel.

Since the LCV fuel does not pass through swirl mixer 150, there is a less intense mixing area with air in second volume 62 and only a small amount of mixing with the air prior to combustion occurs when compared to the HCV fuel. However, for the LCV fuel, this is preferred since the composition does not favour a high degree of mixing pre-combustion to result in the lower emissions of CO and NOx.

Combustion occurs downstream of LCV fuel inlet 135. There is a complementary effect of the swirl mixer 150: the combustion of an LCV fuel typically results in a longer flame, i.e. a greater length than a HCV flame, this is partly due to the less intense combustion and greater volumetric flow; the reverse flow region from the swirl mixer 150, reduces the flame length of the LCV fuel flame. Such a reduction in flame length is useful for space saving, allowing a shorter, more compact swirl burner body 12, but also for protecting instrumentation toward the downstream end of, or even beyond the downstream end of the swirl burner assembly 10 (i.e. downstream of body bottom end wall 14).

As the temperature of the fuel cell stack increases toward 550 deg C., the control system reduces the HCV flow and hence the mixed operation of the HCV and LCV fuels moves toward a solely LCV fuel operation as the fuel cell undertakes electrochemical reactions.

3) Idle/Power Draw

In the third mode of operation, the fuel cell stack is typically at about 550 deg C. (the exact temperature of individual fuel cells and individual fuel cell components will vary; the fuel cells of the fuel cell stack will operate in the range of about 500-610 deg C., or from about 500-615 deg C. or about 500-620 deg C.). This is a predominantly LCV fuel situation. In this mode, the LCV fuel continues to be fed into the burner through LCV tube 130. However, the LCV fuel flow rate is now determined by the fuel cell stack, and the electrical output required by the fuel cell system.

The air flow through the fuel cell system during this operation mode is controlled by the temperature of the fuel cell stack. The outlet temperature of the burner is monitored, and if it drops below a certain threshold, additional HCV fuel is added to increase the temperature of the system which will maintain or increase the temperature of the fuel cell stack. However, the system is ideally designed such that only LCV fuel is required in this mode.

4) Shut Down

In the fourth mode of operation, the LCV fuel flow is reduced to reduce fuel cell stack and fuel cell system temperatures until fuel cell stack reaches around 450 deg C., HCV fuel flow to the fuel cell system is stopped, which in turn stops the flow of LCV fuel through LCV fuel inlet 135 is stopped and combustion ceases. The fuel cell system is then left to cool down naturally.

Referring to FIGS. 8A to 10C, a number of trends showing empirical results are shown. The labels of the trends are summarized as listed.

$NO_x$ Air Free—Air free $NO_x$ emissions from the burner,
  Data points shown as an upward pointing triangle;
CO Air Free—Air free CO emissions from the burner,
  Data points shown as a downward pointing triangle;
tAirTgbOut—Temperature of air out of the burner,
  Data points shown as a square;
tAirTgbIn—Temperature of air into the burner,
  Data points shown as a circle;
dmolFuelRef—LCV fuel flow into the burner,
  Data points shown as a vertical bar;
dmolFuelTgb—HCV fuel flow into the burner,
  Data points shown as an asterisk;
lambda—The fuel to air ratio of the burner at the burner inlets,
  Data points shown as a solid diamond.

FIGS. 8A to 10C show the graphical plots of the results of the real operation of the swirl burner assembly in a number of modes of operation along with the swirl burner assembly reaction to various events. The three Figures per operation (i.e. A, B and C) are all showing the same operating period for a swirl burner assembly according to the present invention. The time period for this data acquisition (x axis measured in hours) is not shown to start from zero and represents different operating phases of the burner of the present invention during a continuous test.

Figure 8A:
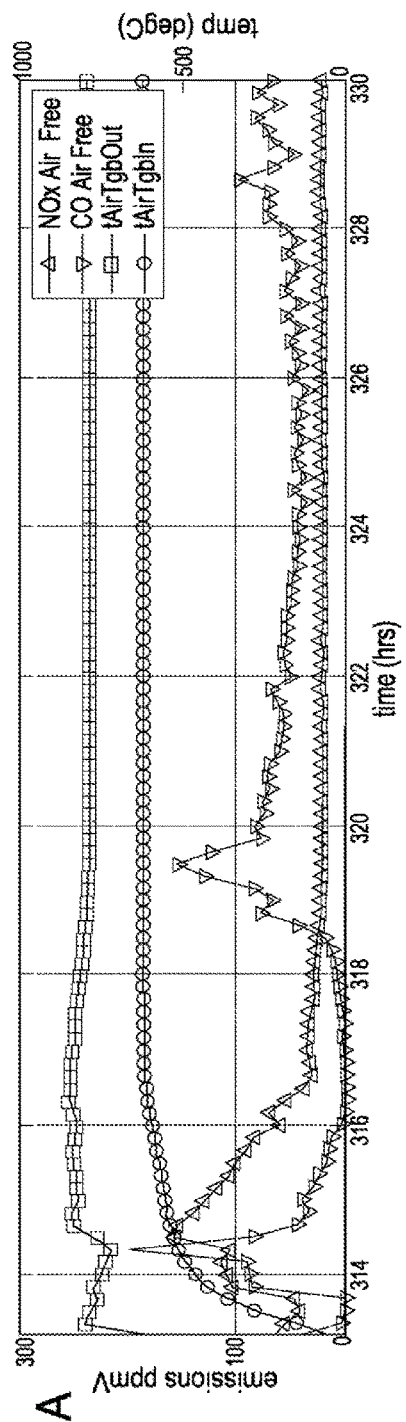
FIG. 8A shows a trend from test result data of a phase of operations of a swirl burner according to the present invention. Temperature and Emissions are shown vs. Time, where the swirl burner is initially in a start-up operation mode and then a steady-state operation mode.
Figure 9A:
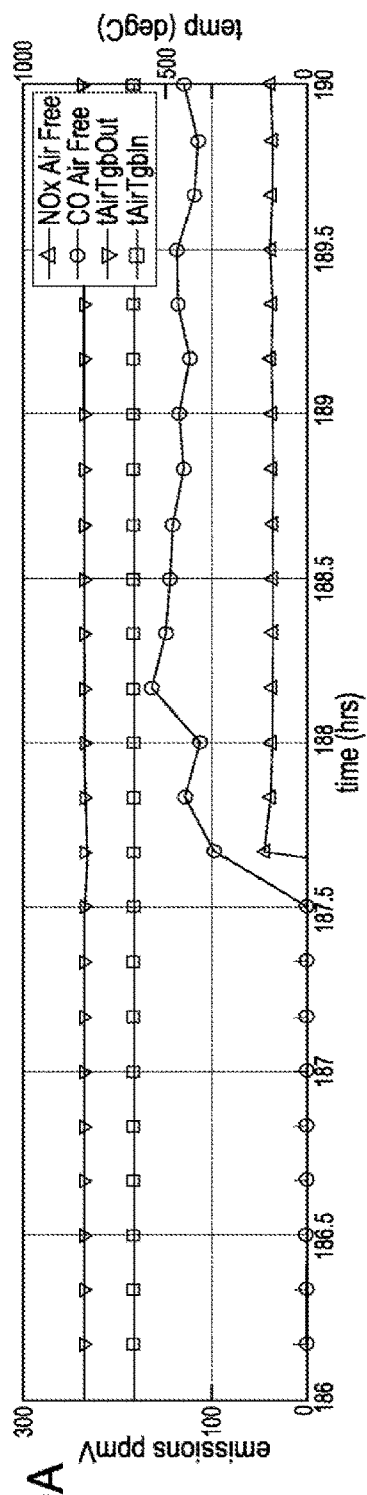
FIG. 9A shows a trend from test result data of a phase of operations of a swirl burner according to the present invention. Temperature and Emissions are shown vs. Time, where the swirl burner in steady-state operation is subjected to a step change.
Figure 10A:
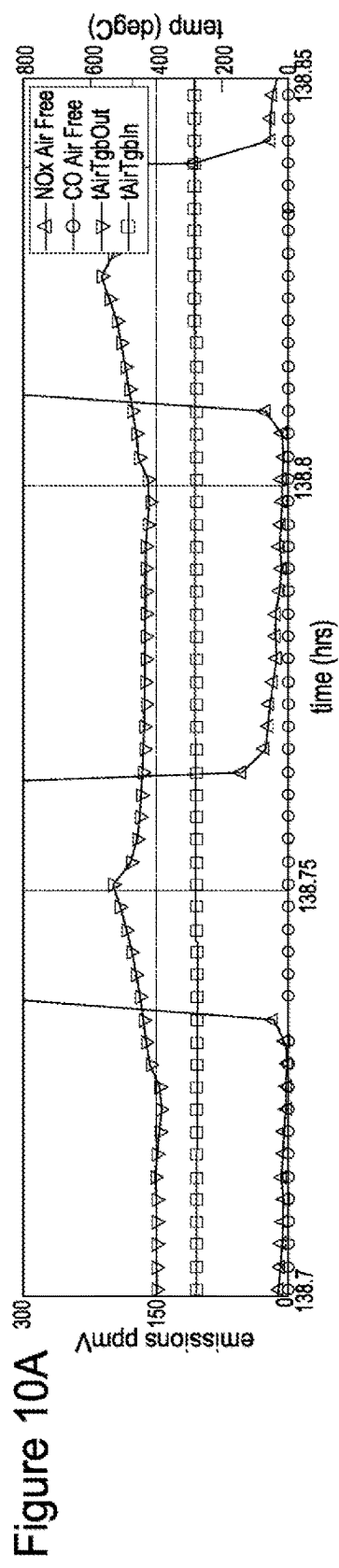
FIG. 10A shows a trend from test result data of a phase of operations of a swirl burner according to the present invention. Temperature and Emissions are shown vs. Time, where the swirl burner under goes a number of hot starts.

The trends in FIGS. 8A, 9A and 10A show the air temperature in and out of the swirl burner assembly and is provided to show the swirl burner assembly is producing heat itself—as indicated by tAirTgbOut—and that the fuel cell stack is being heated by the burner operation and the hot off-gases are being fed back into the swirl burner assembly—as indicated by tAirTgbIn, i.e. the temperature into the swirl burner assembly. The top most trend also shows the carbon monoxide (CO) and Nitrous Oxides ($NO_x$) within the combusted gases, i.e. gases leaving the swirl burner assembly. These are measured in parts per million volume (ppmv)—which is the typical unit of measurement in the art for such gases and are the air-free measurements, i.e. the adjusted values to simulate oxygen-free conditions in the combustions gases. The CO, $NO_x$ and other combustion products are collectively known as emissions, since they are the primary products that are produced from combustion of gases that are known to be undesirable from an environmental perspective. As such, the reduction of emissions is the subject of much legislation concerning combustion of gases. For the purposes of the invention, emissions will normally refer to just the CO and $NO_x$ since these are the primary products which the invention seeks to reduce.

Figure 8B:
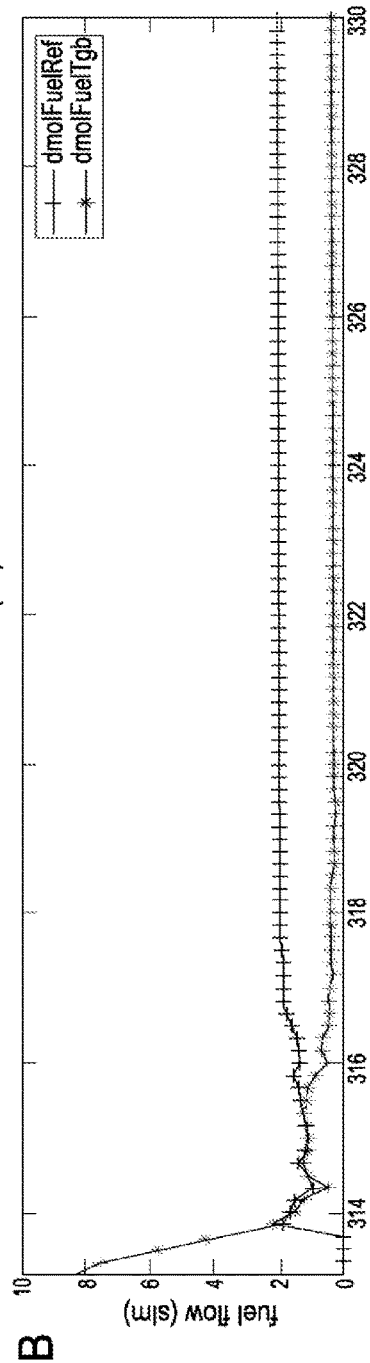
FIG. 8B shows a trend from test result data from the phase of operations of FIG. 8A. Fuel Flow is shown vs. Time.
Figure 9B:
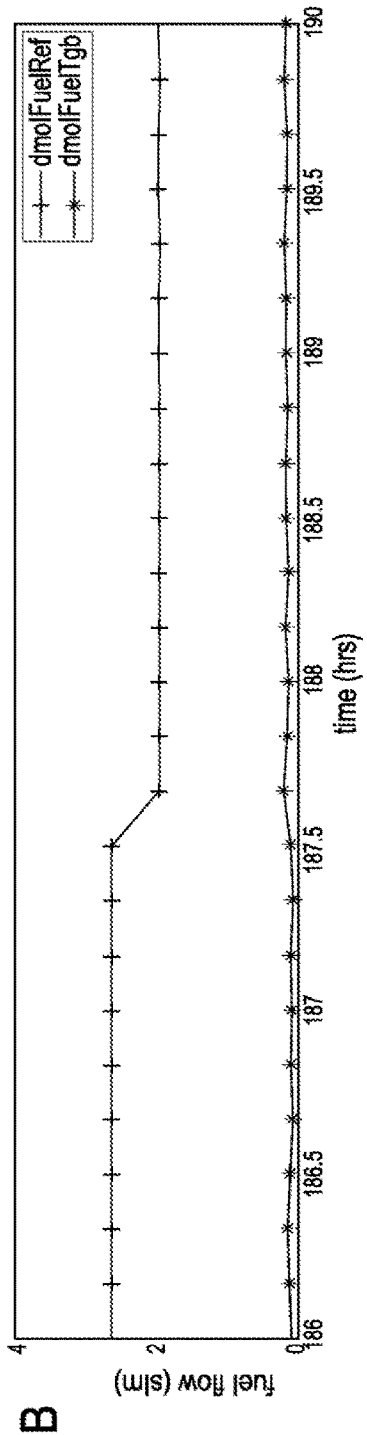
FIG. 9B shows a trend from test result data from the phase of operations of FIG. 9A. Fuel Flow is shown vs. Time.
Figure 10B:
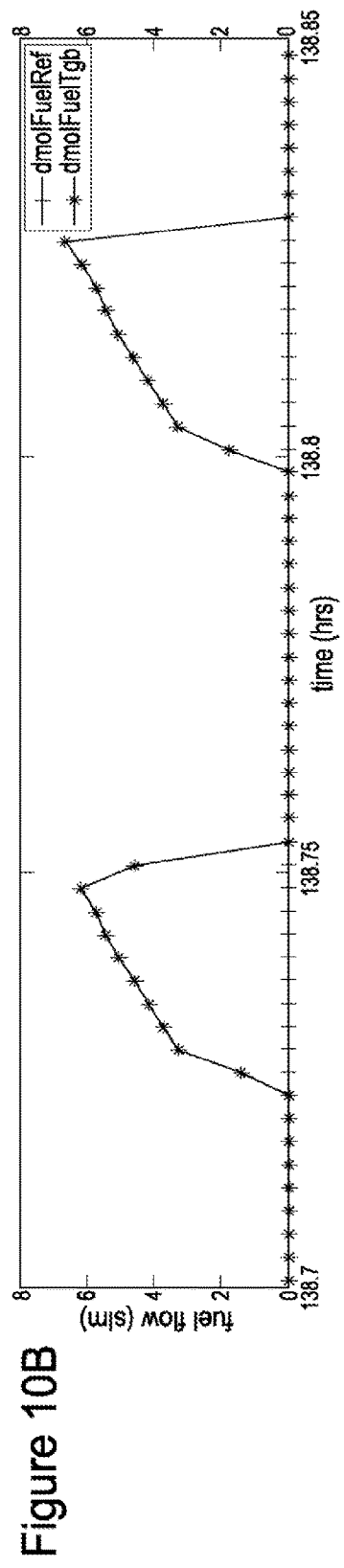
FIG. 10B shows a trend from test result data from the phase of operations of FIG. 10A. Fuel Flow is shown vs. Time.

The trends in FIGS. 8B, 9B, and 10B show the fuel flow of the HCV fuel and LCV fuel. This is fuel flow into the swirl burner assembly and will indicate what mode the swirl burner assembly is operating in. For instance, when there is LCV flow, it is likely from the fuel cell stack which has reached a sufficient temperature to produce anode off-gases which may now be combusted. A HCV fuel flow shown on the trend indicates that there is a HCV fuel flow to the swirl burner assembly. HCV fuel flow is possible in any mode of operation, since its feed is independent of fuel cell operation.

Figure 8C:
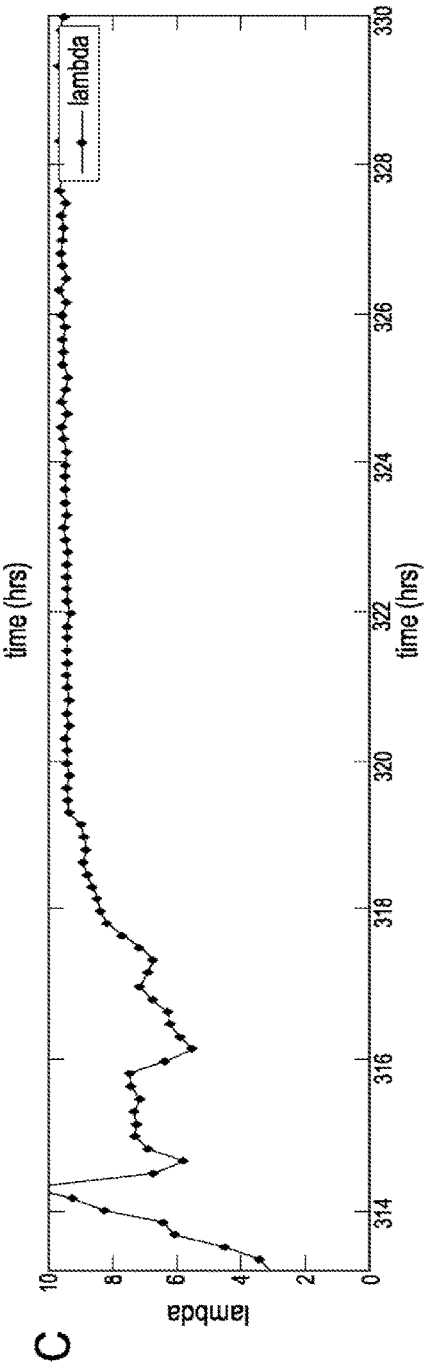
FIG. 8C shows a trend from test result data from the phase of operations of FIG. 8A. Lambda is shown vs. Time.
Figure 9C:
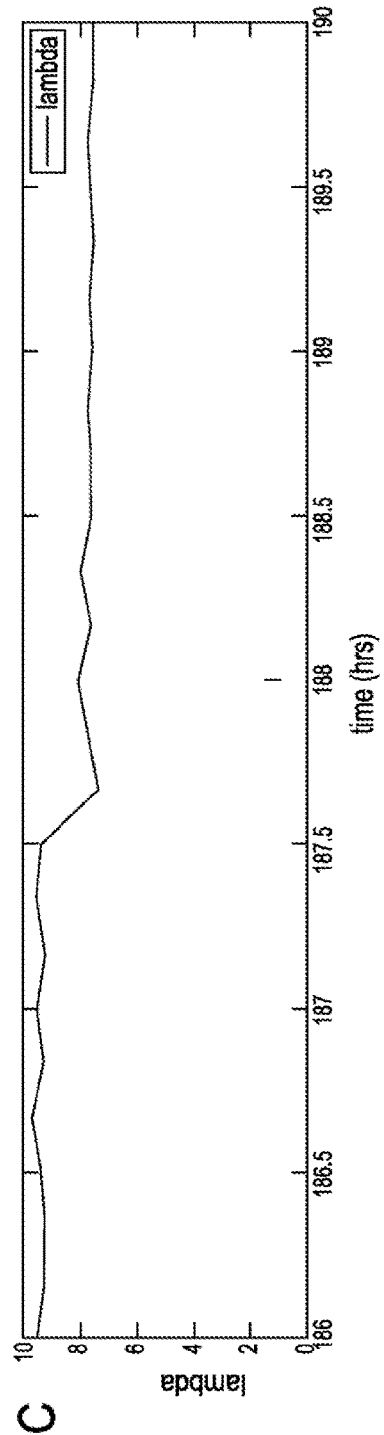
FIG. 9C shows a trend from test result data from the phase of operations of FIG. 9A. Lambda is shown vs. Time.
Figure 10C:
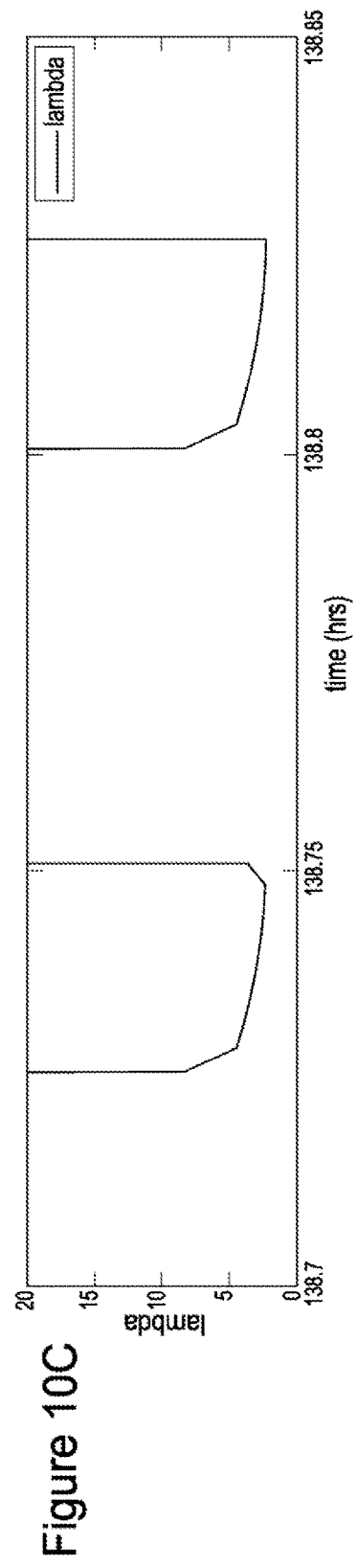
FIG. 10C shows a trend from test result data from the phase of operations of FIG. 10A. Lambda is shown vs. Time.

The trends in FIGS. 8C, 9C, and 10C show a ratio of the air to the fuel, where an equal proportion of air to fuel will have a lambda of 1, and as the proportion of air increases such that a mixture of air and fuel becomes more lean, the lambda will increase. The lambda trend shows the total lambda of the fuel and oxidant flow at the swirl burner assembly inlets, i.e. the flow at air inlet 70, LCV inlet 135 and HCV inlet 125. The lambda shown includes a calculation of the depletion of oxygen in the air stream when the fuel cell is operating. The lambda of the combustion reactants is important since the oxidant flow is controlled by the fuel cell stack. It is therefore desirable to have a swirl burner assembly which is able to operate over a large lambda range such that the oxidant flow does not need to be compensated by additional fuel flow for the burner to produce a stable combustion. Note, where the fuel flow has stopped, the lambda on the trend will increase off the scale, this is because with no fuel flow, the ratio of air to fuel is infinitely great. This is typically seen on the trends where the lambda increases above 20.

Referring to FIGS. 8A, 8B and 8C, initially we can see in FIG. 8B that the fuel flow starting at 8 SLM is a HCV fuel. The temperature into the swirl burner assembly shown in FIG. 8A is initially quite low and certainly below the 275 deg C. required for the reforming operation of the fuel stack to commence. This is therefore mode 1: warm-up, non-reforming. The swirl burner assembly is in a purely HCV mode and the lambda is quite low, around 3 to 4 lambda, as seen in FIG. 8C, that is to say that the fuel mix is quite rich to create the heat necessary for heating up the fuel cell stack. Notably, although this is a purely HCV fuel mode in a warm-up phase, the emissions are still very low and even below the required limits. Note that for emission limits, it usual that the emissions are averaged over a period, start-up is an expected period where emissions are known to be greater.

As the fuel cell stack temperature increases, the system is able to start reforming and LCV fuel is available for the swirl burner assembly. This is seen by the increase in the air temperature entering the swirl burner assembly and the initiation of LCV fuel flow. There is a brief increase in emissions at this stage, but as the lambda drops and the temperature rises, the emissions quickly drop to far below the target. The burner is in mode 2: warm-up reforming. This is a dual fuel operation, two flows are being combusted by the same burner in the same flame tube (i.e. second volume 62) and the resulting emissions are low.

The temperature of the fuel stack then reaches a nominal level, seen by the levelling off of the temperature into the swirl burner assembly. This is now mode 3: steady state. In this mode the swirl burner assembly is predominantly fuelled by LCV fuel supplied from the fuel cell. The design of the burner results in very low emissions, the $NO_x$, emissions being around a tenth of the limit and the CO being even lower.

FIGS. 8A to 8C clearly demonstrate that the geometry and positioning of the fuel inlets have resulted in a swirl burner assembly which can cope with various fuels with very different combustion requirements, yet still have low emissions.

Note that where the trend key is shown in the top right hand corners of FIGS. 8A and 8C, the data points continue mostly in the manner in which they did prior to this key and there are no untoward data points being obscured.

FIGS. 9A to 9C show a steady state operation with a step change, such a step change can occur due to a different current draw from the fuel cell stack. This will result in a different fuel flow to the swirl burner assembly and a different mix of HCV and LCV fuel. It is a known issue that step changes can result in emissions spikes due to different combustion characteristics and incidences such as flame switching. In this case the swirl burner assembly was running with very low emissions. When the step change occurs, i.e. when the fuel flow changes, the emissions do increase slightly, but still well below the limits. This shows the resilience the swirl burner assembly has to varying fuel flows when at steady state.

Note that where the trend key is shown in the top right hand corners of FIG. 10A, the data points continue mostly in the manner in which they did prior to this key and there are no untoward data points being obscured.

It is a known issue that hot starts can cause issues for burners and fuel cell systems. Combustion characteristics due to the high air inlet temperature can be very different resulting in instability in the flame and as a result emissions can very high. A fuel cell stack can take 12 to 16 hours to cool down to cold start conditions, whereas the fuel cell is often required more frequently. It is therefore desirable for a swirl burner assembly to be able perform a hot start-up yet maintain low emissions. In FIGS. 10A to 10C such a situation is shown, the system is restarted when the temperature into the swirl burner assembly is still high, approx. 300 deg C., yet in each case, the emissions do not greatly exceed the limits, with the CO being very low.

Note that where the trend key is shown in the top right hand corners of FIG. 10A, the data points continue mostly in the manner in which they did prior to this key and there are no untoward data points being obscured.

Overall the design of the swirl burner assembly results in lower emissions when fuelled by various fuels in single mode and mixed mode, along with operating over a large lambda range and having a small flame length allowing for a compact design.

The present invention is not limited to the above embodiments only, and other embodiments will be readily apparent to one of ordinary skill in the art without departing from the scope of the appended claims.

REFERENCE SIGNS

10 Swirl burner assembly
12 Swirl burner body
12' Central axis
14 Swirl burner body bottom (or second) end wall
15 Swirl burner body exhaust
16 Swirl burner body top (or first) end wall
16' Opening in swirl burner body top (or first) end wall
20 Burner unit first end
30 Swirl burner body downstream end
40 Burner wall
40' Opening in burner wall
42 Burner wall downstream face
44 Burner wall upstream face
50 Burner tube
52 First volume
54 Inner face of swirl burner body top (or first) end wall
56 Burner tube inner surface
62 Second volume
64 Body inner surface
66 Body outer surface
70 Air inlet
80 Igniter
82 Igniter opening
100 Burner unit
110 Burner unit outer body
111 Burner unit top inner surface
112 Shoulder
114 Inner face of burner unit outer body
115 Air inlet holes
116 Burner unit inner volume 120 HCV fuel tube
121 HCV fuel tube inner surface
122 HCV fuel tube outer surface
123 HCV tube internal volume
124 Burner unit second end
125 HCV inlet
130 LCV fuel tube
130' Finger
131 LCV fuel tube inner surface
132 LCV fuel tube outer surface
133 LCV tube internal volume
135 LCV inlet
140 Outer collar
144 Outer collar outer surface
150 Swirl mixer
155 Vanes
160 Inner collar
162 Inner collar outer surface
163 Inner collar inner surface
200 Swirl burner assembly with oxidant curtain
210 Air split opening
300 Swirl burner assembly
310 Outer wall
320 Bypass opening
360 Inner wall
361 Outer wall inner surface
362 Second volume (air bypass)
363 Third volume
364 Inner wall inner surface
366 Inner wall outer surface
400 Swirl burner assembly

The invention claimed is:

1. A swirl burner assembly comprising:
   (i) a hollow longitudinally elongate body extending along a central axis and having a hollow longitudinally elongate body first end and a hollow longitudinally elongate body second end,
   (ii) an end wall at said hollow longitudinally elongate body first end,
   (iii) a burner wall located between said hollow longitudinally elongate body first end and said hollow longitudinally elongate body second end, and defining a first volume from said hollow longitudinally elongate body first end to said burner wall, and a second volume from said burner wall to said hollow longitudinally elongate body second end,
   (iv) an oxidant inlet into said first volume,
   (v) at least one hollow longitudinally elongate burner unit having a burner unit first end extending outwardly of an opening in said body from said first volume, the burner unit extending through an opening in said burner wall from said first volume to said second volume to a burner unit second end, and defining a burner unit inner volume, and comprising:
      (a) an axial-swirl swirl mixer positioned inward of the burner unit and located between said burner unit first end and said burner unit second end, said swirl mixer comprising a plurality of vanes having an inner diameter and an outer diameter, a first side which is positioned towards and opening into said first volume, and a second side positioned towards and opening into said second volume,
      (b) a first fuel inlet into said first volume, said first fuel inlet positioned between said oxidant inlet and said swirl mixer and radially inward of said outer diameter of said plurality of vanes, said first fuel inlet having a first fuel inlet flow area, and
      (c) a second fuel inlet into said second volume proximal said burner unit second end and radially inward of said outer diameter of said plurality of vanes,
   where each at least one burner unit:
      (A) defines a first point which is the point along said central axis closest to said hollow longitudinally elongate body first end where a plane perpendicular to said central axis intersects said plurality of vanes of said swirl mixer;
      (B) defines a second point which is the point along said central axis furthest from said hollow longitudinally elongate body first end where a plane perpendicular to said central axis intersects said plurality of vanes of said swirl mixer; and
      (C) defines a geometric mid-point along said central axis equidistant from said first point and said second point,
   wherein:
      each first fuel inlet is located at a point between said oxidant inlet and said swirl mixer which intersects with a plane perpendicular to said central axis, and which plane intersects with a point along said central axis between 1 and 2 equivalent circular diameters of said first fuel inlet flow area from said first point, and
      each second fuel inlet is located at a point between said first fuel inlet and said hollow longitudinally elongate body second end which intersects with a plane perpendicular to said central axis, and which plane intersects with a point along said central axis equal to or less than said inner diameter of said plurality of vanes from said geometric mid-point.

2. The swirl burner assembly according to claim 1, at least one burner unit further comprising:
   i) an outer collar extending through said opening in said burner wall from said first volume toward said second volume, said outer collar having an outer collar outer diameter, an outer collar inner diameter, an outer collar first end and an outer collar second end; and
   ii) comprises an inner collar extending through said opening in said burner wall from said first volume toward said second volume, said inner collar having an inner collar outer diameter, an inner collar inner diameter, an inner collar first end and an inner collar second end.

3. The swirl burner assembly according to claim 2, wherein said inner collar is located radially internal to said outer collar.

4. The swirl burner assembly according to claim 2, wherein said plurality of vanes extend radially between said outer collar and said inner collar, and said outer collar inner diameter is equal to said outer diameter of the plurality of vanes and said inner collar outer diameter is equal to said inner diameter of the plurality of vanes.

5. The swirl burner assembly according to claim 1, wherein said first and second fuel inlets are each located at points radially inward of the inner diameter of the plurality of vanes.

6. The swirl burner assembly according to claim 1, said body being multi-walled, said multiple walls extending from said burner wall to said hollow longitudinally elongate body second end, and comprising:
   an inner wall having an inner surface, said second volume being defined between said burner wall, said hollow longitudinally elongate body second end and said inner wall inner surface; and
   (ii) an outer wall located outwards of said inner wall, a third volume being defined between said burner wall, said inner wall, said outer wall and said hollow longitudinally elongate body second end, said burner wall additionally comprising at least one bypass opening between said first volume and said third volume and defining a fluid flow path, wherein said bypass opening is a channel in fluid flow communication from said first volume to said third volume.

7. The swirl burner assembly according to claim 6, wherein said at least one bypass opening comprises a plurality of bypass openings radially concentric with reference to said outer diameter of said plurality of vanes.

8. A method of operating a swirl burner assembly according to claim 1, the method comprising the steps of:
supplying an oxidant to said oxidant inlet;
(ii) supplying a fuel comprising at least one of an HCV fuel to said first fuel inlet and an LCV fuel to said second fuel inlet; and
(iii) combusting said fuel in said second volume.

9. The method according to claim 8, wherein when HCV fuel is supplied to said HCV fuel inlet, said oxidant and said HCV fuel flow converge in said first volume between said first fuel inlet and said swirl mixer, and when LCV fuel is supplied to said LCV fuel inlet, said oxidant and said LCV fuel flow converge in said second volume between said swirl mixer and said hollow longitudinally elongate body second end.

10. The method according to claim 8, wherein said HCV fuel and/or said LCV fuel is ignited or combusted in said second volume by an igniter.

11. The method according to claim 8, wherein the velocity of said HCV fuel through said first fuel inlet of said at least one burner unit is between 3 and 6 m/2 and/or the velocity of said LCV fuel through said second fuel inlet of said at least one burner unit is between 10 and 35 m/s.

12. A swirl burner assembly comprising:
(i) a hollow longitudinally elongate body extending along a central axis and having a hollow longitudinally elongate body first end and a hollow longitudinally elongate body second end,
(ii) an end wall at said hollow longitudinally elongate body first end,
(iii) a burner wall located between said hollow longitudinally elongate body first end and said hollow longitudinally elongate body second end, and defining a first volume from said hollow longitudinally elongate body first end to said burner wall, and a second volume from said burner wall to said hollow longitudinally elongate body second end,
(iv) an oxidant inlet into said first volume,
(v) at least one hollow longitudinally elongate burner unit having a burner unit first end extending outwardly of an opening in said body from said first volume, the burner unit extending through an opening in said burner wall from said first volume to said second volume to a burner unit second end, and defining a burner unit inner volume, and comprising:
(a) an axial-swirl swirl mixer positioned inward of the burner unit and located between said burner unit first end and said burner unit second end, said swirl mixer comprising a plurality of vanes having an inner diameter and an outer diameter, a first side which is positioned towards and opening into said first volume, and a second side positioned towards and opening into said second volume,
(b) a first fuel inlet into said first volume, said first fuel inlet positioned between said oxidant inlet and said swirl mixer and radially inward of said outer diameter of said plurality of vanes, said first fuel inlet having a first fuel inlet flow area, and
(c) a second fuel inlet into said second volume proximal said burner unit second end and radially inward of said outer diameter of said plurality of vanes,
where each at least one burner unit:
(A) defines a first point along said central axis closest to said hollow longitudinally elongate body first end where a plane perpendicular to said central axis intersects said plurality of vanes of said swirl mixer;
(B) defines a second point along said central axis furthest from said hollow longitudinally elongate body first end where a plane perpendicular to said central axis intersects said plurality of vanes of said swirl mixer; and
(C) defines a geometric mid-point along said central axis equidistant from said first point and said second point,
wherein:
each first fuel inlet is located at a point between said oxidant inlet and said swirl mixer which intersects with a plane perpendicular to said central axis, and which plane intersects with a point along said central axis between 1 and 2 equivalent circular diameters of said first fuel inlet flow area from said first point, and
each second fuel inlet is located at a point between said first fuel inlet and said hollow longitudinally elongate body second end which intersects with a plane perpendicular to said central axis, and which plane intersects with a point along said central axis equal to or less than said inner diameter of said plurality of vanes from said geometric mid-point; and
wherein said swirl burner additionally comprises an igniter.

13. The swirl burner assembly according to claim 12, wherein said igniter is located in said second volume and said igniter extends outwardly from said hollow longitudinally elongate body from the second volume.

14. The swirl burner assembly according to claim 12, at least one burner unit further comprising:
i) an outer collar extending through said opening in said burner wall from said first volume toward said second volume, said outer collar having an outer collar outer diameter, an outer collar inner diameter, an outer collar first end and an outer collar second end; and
ii) comprises an inner collar extending through said opening in said burner wall from said first volume toward said second volume, said inner collar having an inner collar outer diameter, an inner collar inner diameter, an inner collar first end and an inner collar second end.

15. The swirl burner assembly according to claim 12, wherein said plurality of vanes extend radially between said outer collar and said inner collar, and said outer collar inner diameter is equal to said outer diameter of the plurality of vanes and said inner collar outer diameter is equal to said inner diameter of the plurality of vanes.

16. A swirl burner assembly comprising:
(i) a hollow longitudinally elongate body extending along a central axis and having a hollow longitudinally elongate body first end and a hollow longitudinally elongate body second end,
(ii) an end wall at said hollow longitudinally elongate body first end,
(iii) a burner wall located between said hollow longitudinally elongate body first end and said hollow longitudinally elongate body second end, and defining a first volume from said hollow longitudinally elongate body first end to said burner wall, and a second volume from said burner wall to said hollow longitudinally elongate body second end, (iv) an oxidant inlet into said first volume, (v) at least one hollow longitudinally elongate burner unit having a burner unit first end extending outwardly of an opening in said body from said first volume, the burner unit extending through an opening in said burner wall from said first volume to said second volume to a burner unit second end, and defining a burner unit inner volume, and comprising:

(a) an axial-swirl swirl mixer positioned inward of the burner unit and located between said burner unit first end and said burner unit second end, said swirl mixer comprising a plurality of vanes having an inner diameter and an outer diameter, a first side which is positioned towards and opening into said first volume, and a second side positioned towards and opening into said second volume, (b) a first fuel inlet into said first volume, said first fuel inlet positioned between said oxidant inlet and said swirl mixer and radially inward of said outer diameter of said plurality of vanes, said first fuel inlet having a first fuel inlet flow area, and (c) a second fuel inlet into said second volume proximal said burner unit second end and radially inward of said outer diameter of said plurality of vanes, where each at least one burner unit:

(A) defines a first point which is the point along said central axis closest to said hollow longitudinally elongate body first end where a plane perpendicular to said central axis intersects said plurality of vanes of said swirl mixer;

(B) defines a second point which is the point along said central axis furthest from said hollow longitudinally elongate body first end where a plane perpendicular to said central axis intersects said plurality of vanes of said swirl mixer; and (C) defines a geometric mid-point along said central axis equidistant from said first point and said second point, wherein:

each first fuel inlet is located at a point between said oxidant inlet and said swirl mixer which intersects with a plane perpendicular to said central axis, and which plane intersects with a point along said central axis between 1 and 2 equivalent circular diameters of said first fuel inlet flow area from said first point, and each second fuel inlet is located at a point between said first fuel inlet and said hollow longitudinally elongate body second end which intersects with a plane perpendicular to said central axis, and which plane intersects with a point along said central axis equal to or less than said inner diameter of said plurality of vanes from said geometric mid-point; and wherein said burner wall has at least one air split opening, said at least one air split opening comprising at least one hole extending from said first volume side of said burner wall to said second volume side of said burner wall.

17. The swirl burner assembly according to claim 16, wherein said at least one air split opening is radially concentric with reference to the outer diameter of said plurality of vanes.

18. The swirl burner assembly according to claim 16, at least one burner unit further comprising:

i) an outer collar extending through said opening in said burner wall from said first volume toward said second volume, said outer collar having an outer collar outer diameter, an outer collar inner diameter, an outer collar first end and an outer collar second end; and ii) comprises an inner collar extending through said opening in said burner wall from said first volume toward said second volume, said inner collar having an inner collar outer diameter, an inner collar inner diameter, an inner collar first end and an inner collar second end.

19. The swirl burner assembly according to claim 16, wherein said plurality of vanes extend radially between said outer collar and said inner collar, and said outer collar inner diameter is equal to said outer diameter of the plurality of vanes and said inner collar outer diameter is equal to said inner diameter of the plurality of vanes.

20. A swirl burner assembly according to claim 16, wherein said first and second fuel inlets are each located at points radially inward of the inner diameter of the plurality of vanes.

* * * * *